US012060892B2

(12) United States Patent
Seike et al.

(10) Patent No.: US 12,060,892 B2
(45) Date of Patent: Aug. 13, 2024

(54) SUPERCHARGER AND METHOD FOR CONNECTING PIPE IN SUPERCHARGER

(71) Applicant: MITSUBISHI HEAVY INDUSTRIES ENGINE & TURBOCHARGER, LTD., Sagamihara (JP)

(72) Inventors: Nariaki Seike, Kanagawa (JP); Sosuke Irie, Kanagawa (JP); Seiichi Iwanami, Kanagawa (JP); Yasushi Matsui, Kanagawa (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 316 days.

(21) Appl. No.: 17/606,860

(22) PCT Filed: Jun. 19, 2019

(86) PCT No.: PCT/JP2019/024342
§ 371 (c)(1),
(2) Date: Oct. 27, 2021

(87) PCT Pub. No.: WO2020/255306
PCT Pub. Date: Dec. 24, 2020

(65) Prior Publication Data

US 2022/0213900 A1 Jul. 7, 2022

(51) Int. Cl.
*F04D 29/42* (2006.01)
*F02B 39/14* (2006.01)
(Continued)

(52) U.S. Cl.
CPC ......... *F04D 29/4206* (2013.01); *F04D 17/10* (2013.01); *F04D 29/056* (2013.01);
(Continued)

(58) Field of Classification Search
CPC .... F04D 29/4206; F04D 17/10; F04D 29/056; F04D 29/063; F04D 29/624;
(Continued)

(56) References Cited

U.S. PATENT DOCUMENTS 5,593,279 A * 1/1997 Hayashi ................ F16L 41/086
285/330
2004/0036277 A1 * 2/2004 Inaba ...................... F28F 9/262
285/124.4
(Continued)

FOREIGN PATENT DOCUMENTS

DE 10 2016 101 458 A1 7/2017
JP 57-191422 A 11/1982
(Continued)

OTHER PUBLICATIONS

International Search Report and Written Opinion of the International Searching Authority for International Application No. PCT/JP2019/024342, dated Aug. 27, 2019, with English translation.

*Primary Examiner* — Woody A Lee, Jr.
*Assistant Examiner* — Eric A Lange
(74) *Attorney, Agent, or Firm* — BIRCH, STEWART, KOLASCH & BIRCH, LLP

(57) ABSTRACT

A supercharger is provided with: a housing; a rotary shaft that is supported inside the housing to be freely rotatable; a compressor wheel that is provided at one end in an axial direction of the rotary shaft; a cooling water supplying pipe and a cooling water discharging pipe that have a flange part at an end and are connected to the housing; and a lubricant supplying pipe that has a flange part at an end and is connected to the housing. The ends of the cooling water supplying pipe and the cooling water discharging pipe are inserted into a cooling water supplying flow path and a cooling water discharging flow path of the housing, respectively. The end of the lubricant supplying pipe is inserted
(Continued)

into a first supplying flow path of the housing. The flange part presses the flange parts in an insertion direction and is fixed to the housing.

18 Claims, 11 Drawing Sheets

(51) Int. Cl.

| | |
|---|---|
| ***F04D 17/10*** | (2006.01) |
| ***F04D 29/056*** | (2006.01) |
| ***F04D 29/063*** | (2006.01) |
| ***F04D 29/62*** | (2006.01) |

(52) U.S. Cl.
CPC ......... *F04D 29/063* (2013.01); *F04D 29/624* (2013.01); *F02B 39/14* (2013.01)

(58) Field of Classification Search
CPC .... F04D 29/057; F04D 25/06; F04D 29/5806; F02B 39/14; F02B 39/00; F05D 2220/40
See application file for complete search history.

(56) References Cited

U.S. PATENT DOCUMENTS

| | | | | |
|---|---|---|---|---|
| 2008/0210308 | A1 | 9/2008 | Dooley et al. | |
| 2015/0000272 | A1* | 1/2015 | Balsley, II | F02B 67/10 60/605.1 |
| 2019/0368506 | A1 | 12/2019 | Sailer et al. | |
| 2020/0041053 | A1* | 2/2020 | Platova | F01D 25/24 |

FOREIGN PATENT DOCUMENTS

| | | | |
|---|---|---|---|
| JP | 81-9527 | U | 1/1986 |
| JP | 62-82334 | U | 5/1987 |
| JP | 9-310620 | A | 12/1997 |
| JP | 2008-115731 | A | 5/2008 |
| JP | 2014-202104 | A | 10/2014 |
| WO | WO 2005/073810 | A1 | 8/2005 |
| WO | WO 2018/138014 | A1 | 8/2018 |
| WO | WO 2018/144513 | A1 | 8/2018 |
| WO | WO-2020116192 | A1 * | 6/2020 |

* cited by examiner

SUPERCHARGER AND METHOD FOR CONNECTING PIPE IN SUPERCHARGER

TECHNICAL FIELD

The present invention relates to a supercharger that increases the pressure of air taken in by an internal combustion engine, and a method for connecting a pipe in the supercharger.

BACKGROUND ART

For example, an exhaust turbine supercharger has a compressor, a turbine, and a housing. A rotary shaft is rotatably supported in the housing, a compressor wheel is connected to one end portion in an axial direction, and a turbine wheel is connected to the other end portion. Then, an exhaust gas is supplied into the housing, and the turbine wheel rotates, so that the rotary shaft rotates to rotate the compressor wheel. The compressor wheel pressurizes air taken in from the outside to produce compressed air, and supplies this compressed air to an internal combustion engine.

In such an exhaust turbine supercharger, the rotary shaft is rotatably supported by a bearing in the housing, and a lubricant is supplied to the bearing. Therefore, the housing is provided with a lubricant supply flow path for supplying the lubricant from the outside to the bearing, and is provided with a lubricant discharge flow path for discharging the lubricant supplied to the bearing to the outside. Then, a lubricant supply pipe is connected to the lubricant supply flow path, and a lubricant discharge pipe is connected to the lubricant discharge flow path. Further, in the turbine, an exhaust gas is supplied to the inside thereof, so that the housing becomes hot, and thus there is a concern that the lubricant may deteriorate. Therefore, a cooling water flow path for circulating cooling water is provided in the housing. Then, a cooling water supply pipe is connected to an inlet hole for the cooling water flow path, and a cooling water discharge pipe is connected to an outlet hole. Such a supercharger, for example, is described in PTL 1 below.

CITATION LIST

Patent Literature

[PTL 1] Japanese Unexamined Patent Application Publication No. 9-310620

SUMMARY OF INVENTION

Technical Problem

The pipe for the lubricant or the pipe for the cooling water is provided with a flange at an end portion, and the pipe is connected to the housing by fixing the flange to the housing. The supercharger described above has four pipes for the lubricant or the cooling water. In recent years, there has been a demand for integrating and connecting a plurality of pipes at one location as much as possible in order to save space around the internal combustion engine. In this case, it is necessary to secure a mounting surface for fixing flanges of a plurality of pipes on the outer surface of the housing, and thus there is a problem such as an increase in cost due to an increase in the size of the housing, the occurrence of processing work on the mounting surface, or the like.

The present invention is for solving the problem described above, and has an object to provide a supercharger and a method for connecting a pipe in the supercharger, in which it is possible to integrate and connect a plurality of pipes to a housing and to suppress an increase in cost.

Solution to Problem

In order to achieve the object described above, according to an aspect of the present invention, there is provided a supercharger including: a housing; a rotary shaft that is rotatably supported inside the housing; a compressor wheel that is provided at one end portion in an axial direction of the rotary shaft; a first pipe that has a first mounting flange at an end portion thereof and that is connected to the housing; and a second pipe that has a second mounting flange at an end portion thereof and that is connected to the housing, in which the end portion of the first pipe is inserted into a first mounting hole that is provided in the housing, and the end portion of the second pipe is inserted into a second mounting hole that is provided in the housing, and the second mounting flange presses the first mounting flange in an insertion direction and is fixed to the housing.

Therefore, the end portion of the first pipe is inserted into the first mounting hole of the housing, and the end portion of the second pipe is inserted into the second mounting hole of the housing. Therefore, the first pipe and the second pipe are connected to the housing. At this time, the second mounting flange presses the first mounting flange in the insertion direction and is fixed to the housing. That is, the second pipe is fixed to the housing through the second mounting flange, and the first pipe is fixed to the housing through the second mounting flange of the second pipe that is fixed to the housing. Therefore, a plurality of pipes can be integrated and connected to the housing, and an increase in cost can be suppressed by suppressing an increase in the size of the housing, the occurrence of processing work on the mounting surface, or the like.

In the supercharger according to the present invention, the rotary shaft is rotatably supported by the housing through a bearing, and at least one of the first mounting hole and the second mounting hole is a lubricant supply hole or a lubricant discharge hole communicating with the bearing.

Therefore, the pipes for supplying or discharging a lubricant with respect to the bearing that rotatably supports the rotary shaft can be integrated and connected to the housing.

In the supercharger according to the present invention, the housing has a refrigerant flow path provided around the rotary shaft, and at least one of the first mounting hole and the second mounting hole is a refrigerant supply hole or a refrigerant discharge hole communicating with the refrigerant flow path.

Therefore, the pipes for supplying or discharging a refrigerant with respect to the refrigerant flow path that cools the housing can be integrated and connected to the housing.

In the supercharger according to the present invention, the rotary shaft is rotatably supported by the housing through a bearing, one of the first mounting hole and the second mounting hole is a lubricant supply hole or a lubricant discharge hole communicating with the bearing, the housing has a refrigerant flow path provided around the rotary shaft, and the other of the first mounting hole and the second mounting hole is a refrigerant supply hole or a refrigerant discharge hole communicating with the refrigerant flow path.

Therefore, the pipe for supplying or discharging the lubricant with respect to the bearing that rotatably supports the rotary shaft and the pipe for supplying or discharging the refrigerant with respect to the refrigerant flow path that cools the housing can be integrated and connected to the housing.

In the supercharger according to the present invention, the first mounting flange and the second mounting flange overlap in a thickness direction of the first mounting flange and the second mounting flange, and only the second mounting flange is fixed to the housing.

Therefore, by fixing only the second mounting flange to the housing, it is possible to connect the second pipe to the housing, and the second mounting flange presses the first mounting flange, so that the first pipe can be connected to the housing. Therefore, connection portions of a plurality of pipes with respect to the housing can be simplified.

In the supercharger according to the present invention, a rotation prevention mechanism for preventing rotation of the first pipe with respect to the housing is provided.

Therefore, the first pipe is prevented from becoming detached by the second mounting flange of the second pipe, and the rotation thereof is prevented by the rotation prevention mechanism. Therefore, the first pipe can be firmly connected to the housing.

In the supercharger according to the present invention, as the rotation prevention mechanism, a contact portion that comes into contact with the second pipe to prevent rotation of the first pipe is provided in the first mounting flange.

Therefore, as the rotation prevention mechanism, the contact portion is provided in the first mounting flange, so that the contact portion of the first mounting flange comes into contact with the second pipe to prevent the rotation of the first pipe, and thus the rotation of the first pipe can be easily prevented without changing the structure of the first pipe.

In the supercharger according to the present invention, as the rotation prevention mechanism, a contact portion that comes into contact with the second mounting flange to prevent rotation of the first pipe is provided in the first pipe.

Therefore, as the rotation prevention mechanism, the contact portion is provided in the first pipe, so that the contact portion of the first pipe comes into contact with the second mounting flange to prevent the rotation of the first pipe, and thus the rotation of the first pipe can be easily prevented without changing the structure of the first mounting flange.

In the supercharger according to the present invention, as the rotation prevention mechanism, a contact portion that comes into contact with the housing to prevent rotation of the first pipe is provided in the first mounting flange.

Therefore, as the rotation prevention mechanism, the contact portion is provided in the first mounting flange, so that the contact portion of the first mounting flange comes into contact with the housing to prevent the rotation of the first pipe, and thus the rotation of the first pipe can be easily prevented without changing the structure of the first pipe.

In the supercharger according to the present invention, the first mounting flange and the second mounting flange overlap in a thickness direction of the first mounting flange and the second mounting flange, and both the first mounting flange and the second mounting flange are fixed to the housing.

Therefore, the first mounting flange and the second mounting flange overlap and fixed to the housing, so that two pipes can be fixed through the two mounting flanges by one fixing member, and thus connection portions of a plurality of pipes can be simplified.

In the supercharger according to the present invention, the first pipe and the second pipe are parallel to each other and are fixed to the housing.

Therefore, the first pipe and the second pipe are parallel to each other, so that the first mounting hole and the second mounting hole are parallel to each other, and therefore, the processing of the two mounting holes with respect to the housing is simplified, so that the workability can be improved and the ease-of-assembly of the two pipes with respect to the two mounting holes can be improved.

In the supercharger according to the present invention, a first mounting surface of the housing, in which the first mounting hole is formed, and a second mounting surface of the housing, in which the second mounting hole is formed, are continuous flat surfaces.

Therefore, by forming the two mounting holes on the mounting surface which is one flat surface, the processing on the mounting surfaces can be easily performed, so that the workability can be improved.

In the supercharger according to the present invention, a first mounting surface of the housing, in which the first mounting hole is formed, and a second mounting surface of the housing, in which the second mounting hole is formed, are flat surfaces having a step therebetween, the first mounting flange comes into contact with the first mounting surface, and the second mounting flange comes into contact with the second mounting surface.

Therefore, even if there is the step between the first mounting surface and the second mounting surface, the first mounting flange is brought into contact with the first mounting surface, and the second mounting flange is brought into contact with the second mounting surface. Therefore, two pipes can be connected to the housing, and a plurality of pipes can be integrated and connected to the housing regardless of the shape of the housing.

In the supercharger according to the present invention, a plurality of the first pipes are provided, and a common first mounting flange is provided at end portions of the plurality of first pipes.

Therefore, the common first mounting flange is provided at the end portions of the plurality of first pipes, so that the plurality of first pipes can be connected to the housing merely by fixing the second mounting flange to the housing, and therefore, the structure can be simplified and the workability can be improved.

In the supercharger according to the present invention, a plurality of the second pipes are provided, and a common second mounting flange is provided at end portions of the plurality of second pipes.

Therefore, the common second mounting flange is provided at the end portions of the plurality of second pipes, so that the plurality of second pipes can be connected to the housing merely by fixing one second mounting flange to the housing, and therefore, the structure can be simplified and the workability can be improved.

In the supercharger according to the present invention, a third pipe that has a third mounting flange at an end portion thereof and that is connected to the housing is provided, the first mounting flange and the second mounting flange overlap in a thickness direction of the first mounting flange and the second mounting flange, the second mounting flange and the third mounting flange overlap in a thickness direction of the second mounting flange and the third mounting flange, the second mounting flange is fixed to the housing and presses the first mounting flange and the third mounting flange in an insertion direction, and a rotation prevention mechanism for preventing rotation of the first pipe and the third pipe with respect to the housing is provided.

Therefore, three or more pipes can be integrated and connected to the housing, and an increase in cost can be suppressed by suppressing an increase in the size of the housing, the occurrence of processing work on the mounting surface, or the like.

In the supercharger according to the present invention, a turbine wheel is provided at the other end portion in the axial direction of the rotary shaft.

Therefore, in an exhaust turbine supercharger, a plurality of pipes can be integrated and connected to the housing, and an increase in cost can be suppressed by suppressing an increase in the size of the housing, the occurrence of processing work on the mounting surface, or the like.

In the supercharger according to the present invention, a motor that drives the rotary shaft is provided in the housing.

Therefore, in an electric supercharger, a plurality of pipes can be integrated and connected to the housing, and an increase in cost can be suppressed by suppressing an increase in the size of the housing, the occurrence of processing work on the mounting surface, or the like.

According to another aspect of the present invention, there is provided a method for connecting a pipe in a supercharger which includes a housing, a rotary shaft that is rotatably supported inside the housing, a compressor wheel that is provided at one end portion in an axial direction of the rotary shaft, a first pipe that has a first mounting flange at an end portion thereof and that is connected to the housing, and a second pipe that has a second mounting flange at an end portion thereof and that is connected to the housing, the method including: a step of inserting the end portion of the first pipe into a first mounting hole that is provided in the housing; a step of inserting the end portion of the second pipe into a second mounting hole that is provided in the housing; and a step of pressing the first mounting flange in an insertion direction of the second pipe via the second mounting flange to fix the first mounting flange to the housing.

Therefore, a plurality of pipes can be integrated and connected to the housing, and an increase in cost can be suppressed by suppressing an increase in the size of the housing, the occurrence of processing work on the mounting surface, or the like.

Advantageous Effects of Invention

According to the supercharger and the method for connecting a pipe in the supercharger according to the present invention, it is possible to integrate and connect a plurality of pipes to the housing and to suppress an increase in cost.

DESCRIPTION OF EMBODIMENTS

Hereinafter, preferred embodiments of a supercharger and a method for connecting pipes in the supercharger according to the present invention will be described in detail with reference to the accompanying drawings. The present invention is not limited to these embodiments, and in a case where there is a plurality of embodiments, the present invention also includes configurations made by combining the respective embodiments.

First Embodiment

Figure 1:
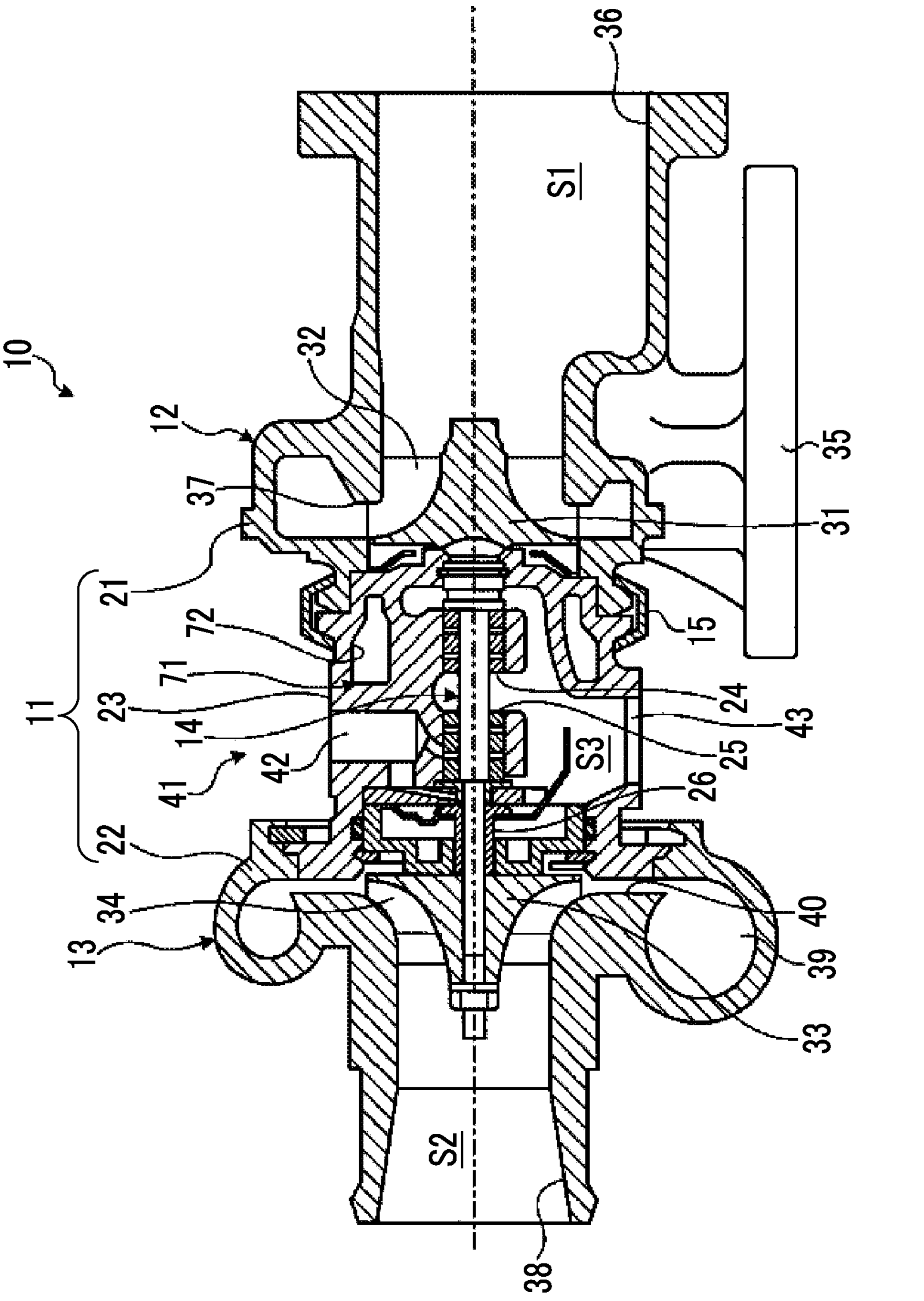
FIG. 1 is a sectional view showing an exhaust turbine supercharger of a first embodiment.
Figure 2:
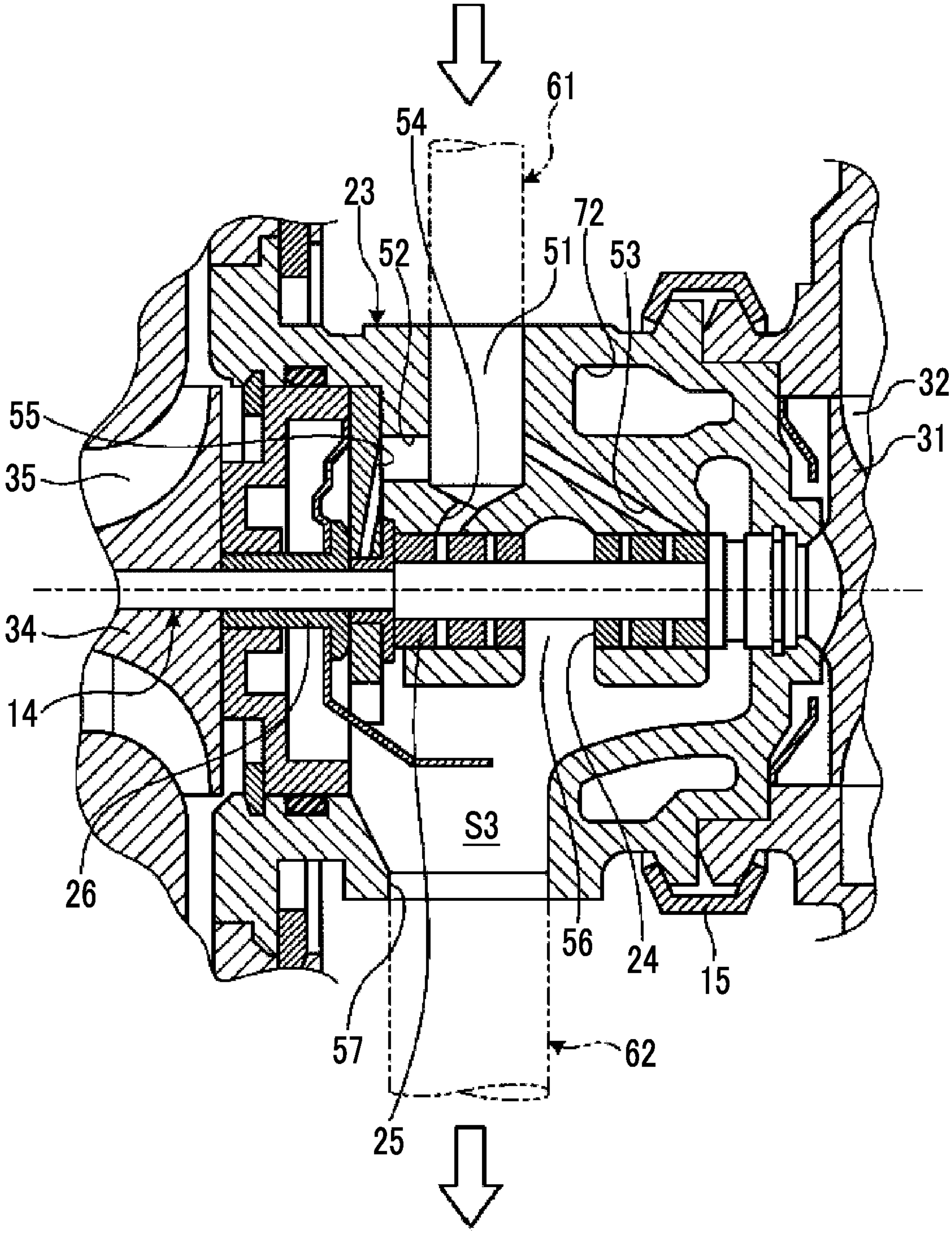
FIG. 2 is a sectional view showing a lubrication system of the exhaust turbine supercharger.
Figure 3:
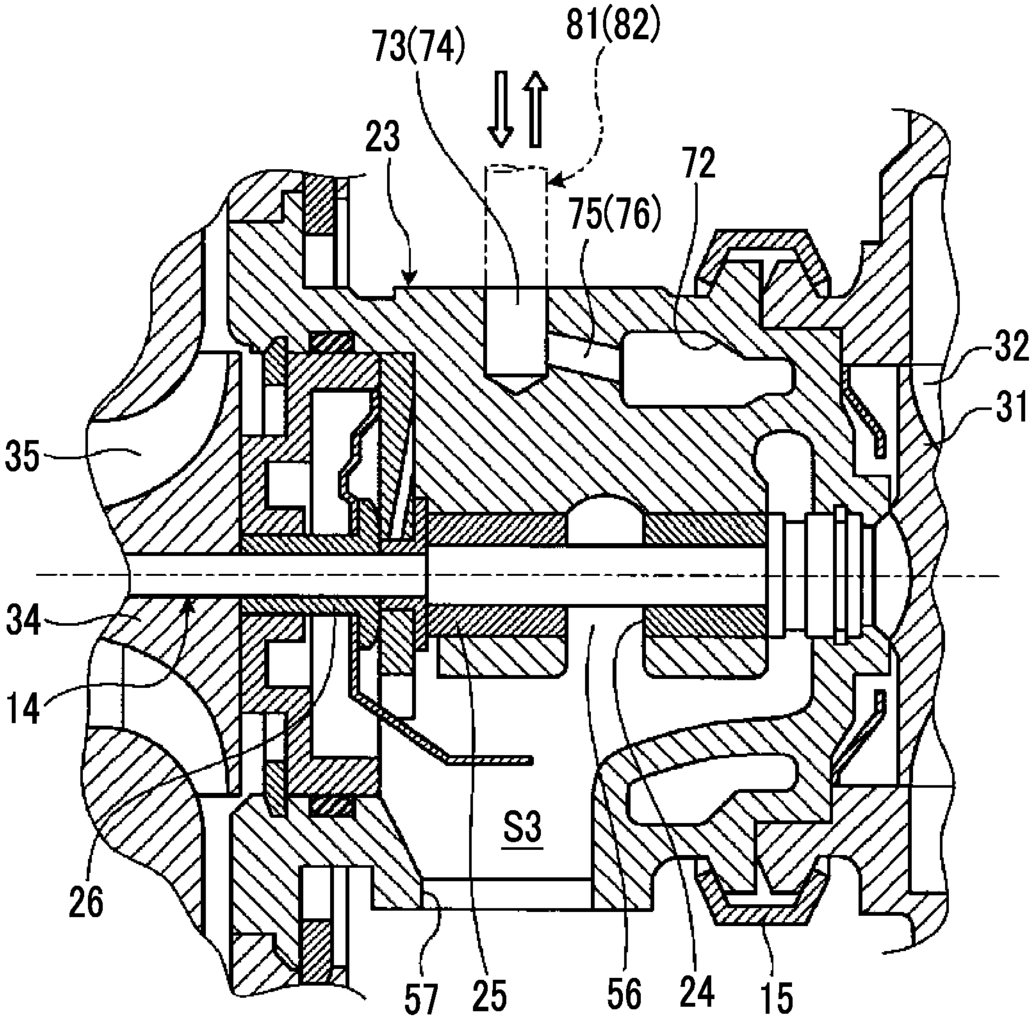
FIG. 3 is a sectional view showing a cooling system of the exhaust turbine supercharger.

FIG. 1 is a sectional view showing an exhaust turbine supercharger of a first embodiment, FIG. 2 is a sectional view showing a lubrication system of the exhaust turbine supercharger, and FIG. 3 is a sectional view showing a cooling system of the exhaust turbine supercharger.

As shown in FIG. 1, an exhaust turbine supercharger 10 as the supercharger according to the present invention includes a housing 11, a turbine 12, a compressor 13, and a rotary shaft 14.

The housing 11 is formed so as to have a hollow inside and is composed of a turbine housing 21 forming a first space portion S1 that accommodates the configuration of the turbine 12, a compressor housing 22 forming a second space portion S2 that accommodates the configuration of the compressor 13, and a bearing housing 23 forming a third space portion S3 that accommodates the rotary shaft 14. The third space portion S3 of the bearing housing 23 is located between the first space portion S1 of the turbine housing 21 and the second space portion S2 of the compressor housing 22.

The rotary shaft 14 is disposed in the bearing housing 23, the end portion on the turbine 12 side is rotatably supported on the bearing housing 23 by a journal bearing 24, and the end portion on the compressor 13 side is rotatably supported on the bearing housing 23 by a journal bearing 25 and a thrust bearing 26. A turbine wheel 31 of the turbine 12 is fixed to one end portion in an axial direction of the rotary shaft 14. The turbine wheel 31 is accommodated in the first space portion S1 of the turbine housing 21, and a plurality of turbine blades 32 forming an axial flow type are provided at the outer peripheral portion at predetermined intervals in a circumferential direction. A compressor wheel 33 of the compressor 13 is fixed to the other end portion in the axial direction of the rotary shaft 14. The compressor wheel 33 is accommodated in the first space portion S1 of the compressor housing 22, and a plurality of blades 34 are provided at the outer peripheral portion at predetermined intervals in the circumferential direction.

The turbine housing 21 is provided with an inlet flow path 35 for the exhaust gas and an outlet flow path 36 for the exhaust gas with respect to the plurality of turbine blades 32. The inlet flow path 35 is provided along the circumferential direction of the rotary shaft 14, and the outlet flow path 36 is provided along the axial direction of the rotary shaft 14. The turbine housing 21 is provided with a turbine nozzle 37 between the inlet flow path 35 and the turbine blade 32. Therefore, the exhaust gas introduced from the inlet flow path 35 is statically expanded by the turbine nozzle 37 and then led to the plurality of turbine blades 32, so that the turbine wheel 31 can be driven and rotated.

The compressor housing 22 is provided with an air intake port 38 and a compressed air discharge port 39 with respect to the compressor wheel 33. The air intake port 38 is provided along the axial direction of the rotary shaft 14, and the compressed air discharge port 39 is provided along the circumferential direction of the rotary shaft 14. The compressor housing 22 is provided with a diffuser 40 between the compressor wheel 33 and the compressed air discharge port 39. Therefore, air as a combustion gas taken in from the air intake port 38 is compressed by the plurality of blades 34 of the compressor wheel 33 that is driven and rotated, and is discharged as compressed air from the compressed air discharge port 39 through the diffuser 40.

In the exhaust turbine supercharger 10 configured in this manner, the turbine 12 is driven by the exhaust gas discharged from an exhaust system of an internal combustion engine (not shown), the rotation of the turbine 12 is transmitted to the rotary shaft 14 to drive the compressor 13, and the compressor 13 compresses the air and supplies it to an intake system of the internal combustion engine.

The exhaust turbine supercharger 10 is provided with an oil supply device 41 that supplies a lubricant to two journal bearings 24 and 25 and one thrust bearing 26. As shown in FIGS. 1 and 2, the oil supply device 41 has a lubricant supply flow path 42 and a lubricant discharge flow path 43 formed in the bearing housing 23. The lubricant supply flow path 42 is composed of a plurality of supply flow paths 51, 52, 53, 54, and 55. The lubricant discharge flow path 43 is composed of a plurality of discharge flow paths 56 and 57.

The first supply flow path (lubricant supply hole) 51 is provided along a radial direction in an upper portion of the bearing housing 23. The second supply flow path 52 is provided along the axial direction in the upper portion of the bearing housing 23, and a base end portion thereof communicates with the first supply flow path 51. The third supply flow path 53 has a base end portion that communicates with the first supply flow path 51, and is provided so as to face the journal bearing 24. The fourth supply flow path 54 has a base end portion that communicates with the first supply flow path 51, and is provided so as to face the journal bearing 25. The fifth supply flow path 55 has a base end portion that communicates with the second supply flow path 52, and is provided so as to face the thrust bearing 26. The first discharge flow path 56 is provided as a space around the rotary shaft 14 between the journal bearing 24 and the journal bearing 25. The second discharge flow path (lubricant discharge hole) 57 is provided along the radial direction in a lower portion of the bearing housing 23.

A lubricant supply pipe 61 has one end portion that is connected to an oil pan (not shown), and the other end portion that is connected to the first supply flow path 51. A lubricant discharge pipe 62 has one end portion that is connected to the second discharge flow path 57, and the other end portion that is connected to the oil pan. The lubricant supply pipe 61 is provided with an oil pump and an oil filter (not shown) in the middle portion thereof.

Therefore, the lubricant supplied from the lubricant supply pipe 61 to the first supply flow path 51 is led to the second supply flow path 52, the third supply flow path 53, the fourth supply flow path 54, and the fifth supply flow path 55. The lubricant led to the third supply flow path 53 is supplied to the outer peripheral surface of the journal bearing 24, and the lubricant led to the fourth supply flow path 54 is supplied to the outer peripheral surface of the journal bearing 25. The lubricants led to the outer peripheral surfaces of the journal bearings 24 and 25 are supplied between the inner peripheral surfaces of the journal bearings 24 and 25 and the outer peripheral surface of the rotary shaft 14 through a large number of through-holes. Further, the lubricant led from the second supply flow path 52 to the fifth supply flow path 55 is supplied between the inner peripheral surface of the thrust bearing 26 and the outer peripheral surface of the rotary shaft 14. Then, the lubricants supplied to the journal bearings 24 and 25 are discharged to the first discharge flow path 56 and fall into the third space portion S3. Further, the lubricant supplied to the thrust bearing 26 falls into the third space portion S3. The lubricants that have fallen into the third space portion S3 are discharged from the second discharge flow path 57 to the lubricant discharge pipe 62.

Further, as shown in FIGS. 1 and 3, the exhaust turbine supercharger 10 is provided with a cooling device 71 that circulates cooling water (a refrigerant) inside the bearing housing 23. The cooling device 71 has a cooling water annular flow path (refrigerant flow path) 72, a cooling water supply flow path (refrigerant supply hole) 73, and a cooling water discharge flow path (refrigerant discharge hole) 74 formed in the bearing housing 23.

The cooling water annular flow path 72 is provided on the turbine 12 side of the bearing housing 23. That is, the cooling water annular flow path 72 is provided extending along the circumferential direction on the outer side in the radial direction of the journal bearing 24 in the bearing housing 23. The cooling water annular flow path 72 is a flow path along the circumferential direction. However, it is interrupted by providing an end portion at the upper portion of the bearing housing 23. Each of the cooling water supply flow path 73 and the cooling water discharge flow path 74 is provided along the radial direction in the upper portion of the bearing housing 23. The cooling water supply flow path 73 and the cooling water discharge flow path 74 are provided so as to be linearly aligned with the first supply flow path 51 of the lubricant supply flow path 42 in the oil supply device 41 in the circumferential direction of the bearing housing 23.

As shown in FIGS. 1 to 3, the bearing housing 23 has a mounting surface 101 formed on the outer peripheral surface of the upper portion thereof. The cooling water supply flow path 73, the first supply flow path 51, and the cooling water discharge flow path 74 are provided to be open in a direction orthogonal to the mounting surface 101. The cooling water supply flow path 73, the first supply flow path 51, and the cooling water discharge flow path 74 are provided side by side in order along a horizontal direction intersecting the axial direction of the rotary shaft 14. In this case, the first supply flow path 51 is provided along the radial direction (radial direction from the center) of the rotary shaft 14. However, the cooling water supply flow path 73 and the cooling water discharge flow path 74 are provided along a direction parallel to the first supply flow path 51, not along the radial direction of the rotary shaft 14. The arrangement order of the flow paths 51, 73, and 74 is not limited to the present embodiment.

A tip portion of the cooling water supply flow path 73 communicates with one end portion of the cooling water annular flow path 72 through a connection flow path 75. The cooling water discharge flow path 74 communicates with the other end portion of the cooling water annular flow path 72 through a connection flow path 76.

A cooling water supply pipe 81 has one end portion that is connected to a discharge side of a cooling water pump (not shown), and the other end portion that is connected to the cooling water supply flow path 73. A cooling water discharge pipe 82 has one end portion that is connected to the cooling water discharge flow path 74, and the other end portion that is connected to a suction side of the cooling water pump.

The cooling water supplied from the cooling water supply pipe 81 to the cooling water supply flow path 73 flows to the cooling water annular flow path 72 through the connection flow path 75. The cooling water flows along the cooling water annular flow path 72 to cool the bearing housing 23 and to indirectly suppress a temperature rise of the lubricant. The cooling water that has flowed through the cooling water annular flow path 72 flows into the cooling water discharge flow path 74 through the connection flow path 76, and is discharged to the cooling water discharge pipe 82.

Figure 4:
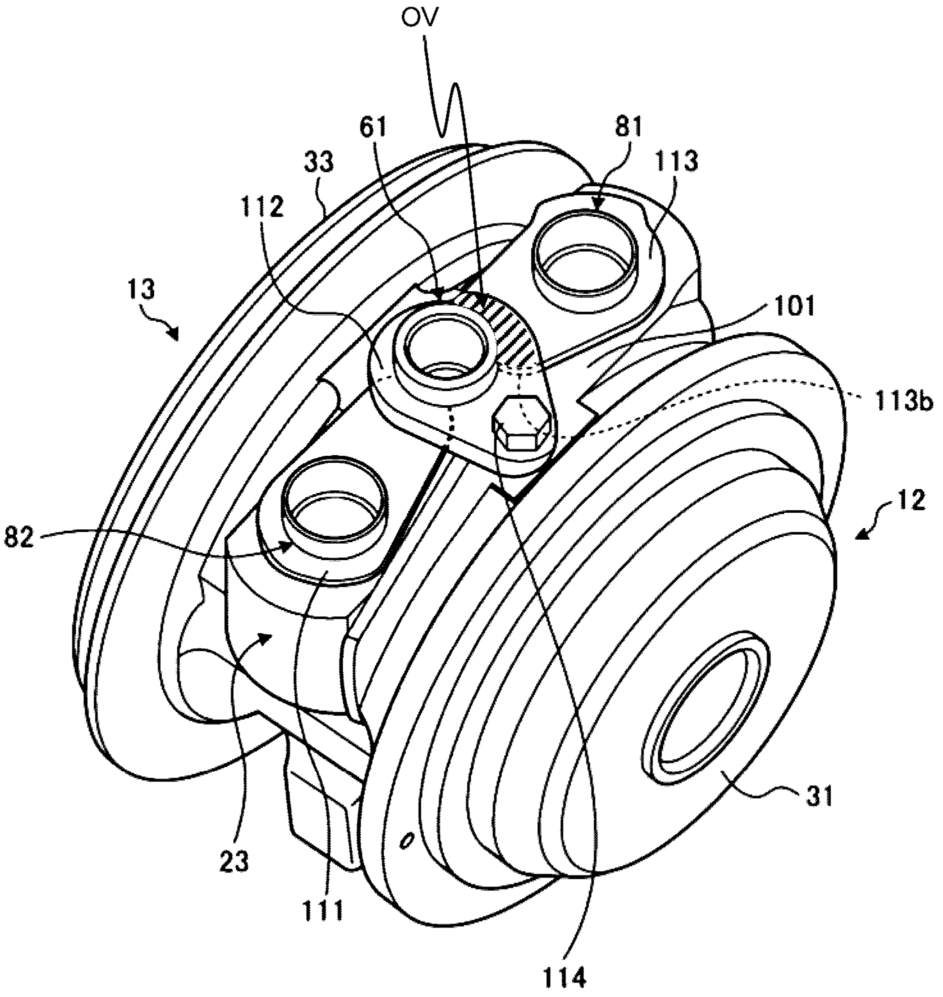
FIG. 4 is a perspective view showing a connection portion of a pipe with respect to a housing.
Figure 5:
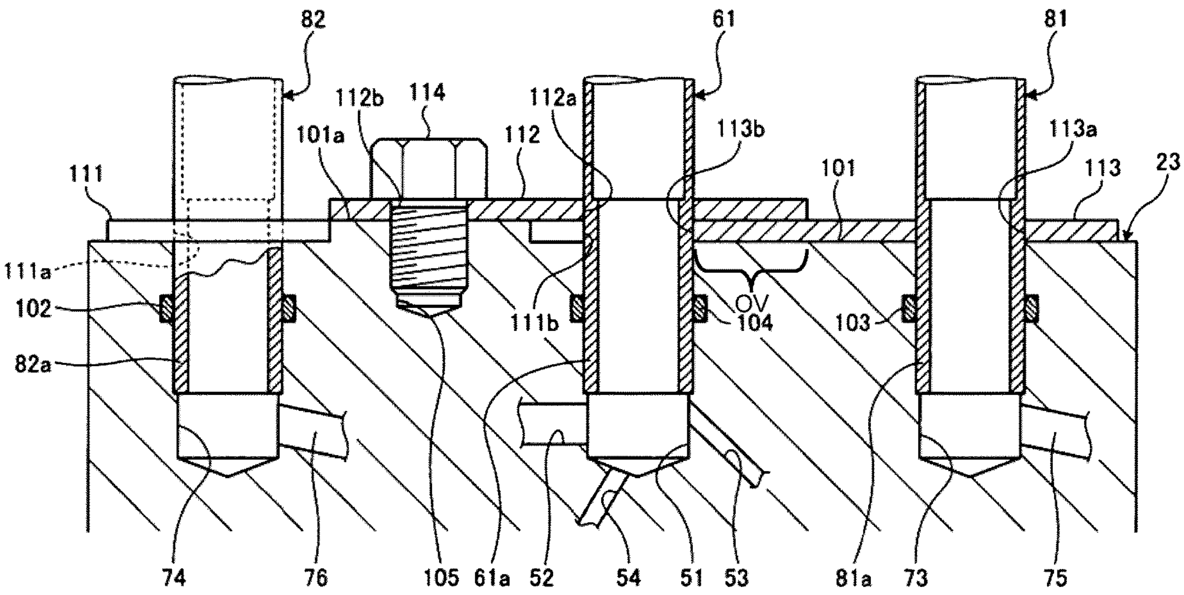
FIG. 5 is a sectional view showing the connection portion of the pipe with respect to the housing.
Figure 6:
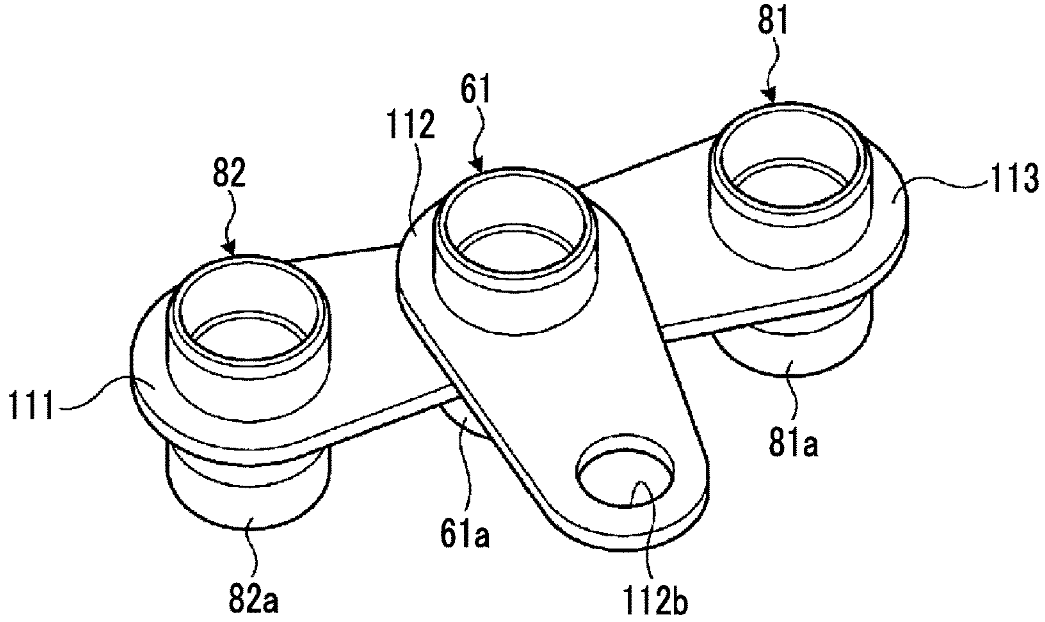
FIG. 6 is a perspective view of the connection portion of the pipe in the first embodiment as viewed from above.
Figure 7:
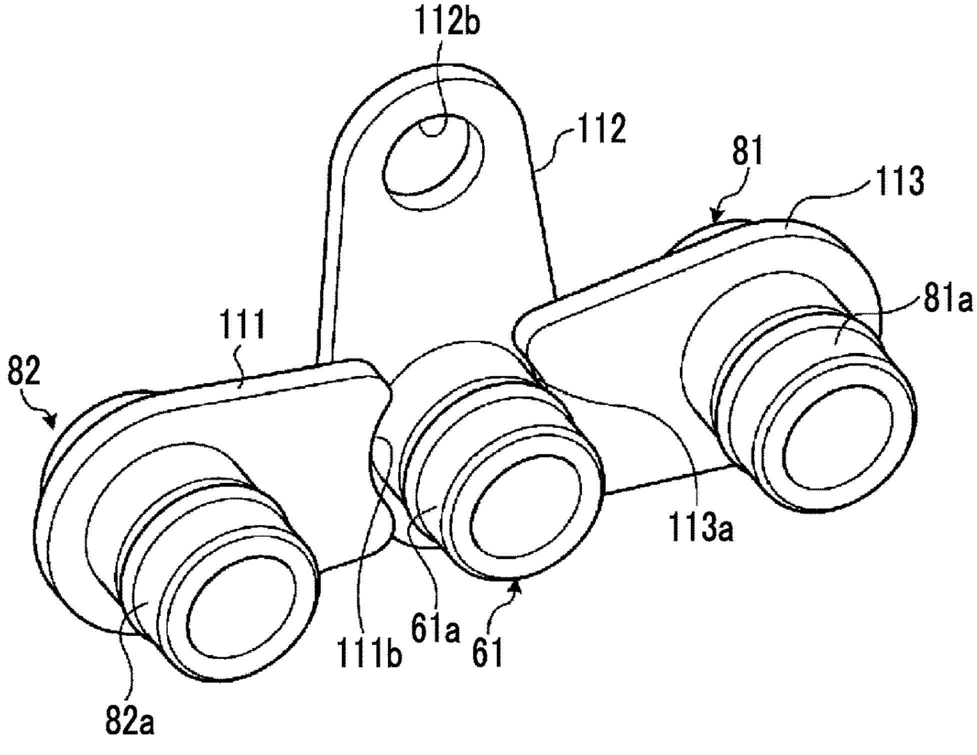
FIG. 7 is a perspective view of the connection portion of the pipe as viewed from below.

Here, in the exhaust turbine supercharger 10 of the first embodiment, the connection portions of the lubricant supply pipe 61, the cooling water supply pipe 81, and the cooling water discharge pipe 82 with respect to the bearing housing 23 will be described in detail. FIG. 4 is a perspective view showing a connection portion of a pipe with respect to a housing, FIG. 5 is a sectional view showing the connection portion of the pipe with respect to the housing, FIG. 6 is a perspective view of the connection portion of the pipe in the first embodiment as viewed from above, and FIG. 7 is a perspective view of the connection portion of the pipe as viewed from below. FIGS. 4 and 5 show the pipes 61, 81, and 82 cut in the middle.

As shown in FIGS. 4 to 7, in the bearing housing 23, the turbine 12 is located on one side in the axial direction of the rotary shaft 14 (refer to FIG. 1), and the compressor 13 is located on the other side. The bearing housing 23 has the mounting surface 101 formed on the upper portion of the outer peripheral surface, and the mounting surface 101 is a flat surface having no step in the radial direction of the bearing housing 23. The first supply flow path 51 configuring the lubricant supply flow path 42, the cooling water supply flow path 73, and the cooling water discharge flow path 74 are formed so as to be open on the mounting surface 101. At this time, the first supply flow path 51, the cooling water supply flow path 73, and the cooling water discharge flow path 74 are orthogonal to the mounting surface 101 and are parallel to each other. Further, the cooling water supply flow path 73, the first supply flow path 51, and the cooling water discharge flow path 74 are provided side by side in order along the horizontal direction intersecting the axial direction of the rotary shaft 14. That is, the first supply flow path 51 is located in the center of the bearing housing 23, and the cooling water supply flow path 73 and the cooling water discharge flow path 74 are located on both sides in the circumferential direction.

Then, an end portion 61*a* of the lubricant supply pipe 61 is connected to the first supply flow path 51, an end portion 81*a* of the cooling water supply pipe 81 is connected to the cooling water supply flow path 73, and an end portion 82*a* of the cooling water discharge pipe 82 is connected to the cooling water discharge flow path 74. Here, the cooling water supply pipe 81 and the cooling water discharge pipe 82 correspond to a first pipe in the present invention, and the lubricant supply pipe 61 corresponds to a second pipe in the present invention. Further, the cooling water supply pipe 81 corresponds to a third pipe in the present invention.

In the first embodiment, in the cooling water discharge pipe (first pipe) 82, a flange part 111 as a first mounting flange is fixed to the end portion 82*a* that is connected to the bearing housing 23. The flange part 111 is fixed at a position separated from the tip of the cooling water discharge pipe 82 by an insertion length. In the lubricant supply pipe (second pipe) 61, a flange part 112 as a second mounting flange is fixed to the end portion 61*a* that is connected to the bearing housing 23. The flange part 112 is fixed at a position separated from the tip of the cooling water discharge pipe 82 by a length obtained by adding the thickness of the flange part 111 to the insertion length. In the cooling water supply pipe (first pipe, third pipe) 81, a flange part 113 as a first mounting flange and a third mounting flange is fixed to the end portion 81*a* that is connected to the bearing housing 23. The flange part 113 is fixed at a position separated from the tip of the cooling water supply pipe 81 by the insertion length.

The flange part 111 has an oval shape, and the cooling water discharge pipe 82 is penetrated and fixed to a through-hole 111*a* formed on one end portion side, and a contact portion 111*b* as a rotation prevention mechanism is formed on the other end portion side. The contact portion 111*b* is for preventing the rotation of the cooling water discharge pipe 82 with respect to the bearing housing 23, and is a recessed portion having a curved shape following the outer peripheral surface of the lubricant supply pipe 61. The flange part 112 has an oval shape, and the lubricant supply pipe 61 is penetrated and fixed to a through-hole 112*a* formed on one end portion side, and a mounting hole 112*b* is formed on the other end portion side. The flange part 113 has an oval shape, and the cooling water supply pipe 81 is penetrated and fixed to a through-hole 113*a* formed on one end portion side, and a contact portion 113*b* as a rotation prevention mechanism is formed on the other end portion side. The contact portion 113*b* is for preventing the rotation of the cooling water supply pipe 81 with respect to the bearing housing 23, and is a recessed portion having a curved shape following the outer peripheral surface of the lubricant supply pipe 61.

The end portion 82*a* of the cooling water discharge pipe 82 is inserted into the cooling water discharge flow path 74 that is provided in the bearing housing 23. At this time, a seal member 102 having a ring shape is interposed between the outer peripheral surface of the cooling water discharge pipe 82 and the inner peripheral surface of the cooling water discharge flow path 74, and the lower surface of the flange part 111 adheres to the mounting surface 101 of the bearing housing 23 without any gap. Further, the end portion 81*a* of the cooling water supply pipe 81 is inserted into the cooling water supply flow path 73 that is provided in the bearing housing 23. At this time, a seal member 103 having a ring shape is interposed between the outer peripheral surface of the cooling water supply pipe 81 and the inner peripheral surface of the cooling water supply flow path 73, and the lower surface of the flange part 113 adheres to the mounting surface 101 of the bearing housing 23 without any gap.

Further, the end portion 61*a* of the lubricant supply pipe 61 is inserted into the first supply flow path 51 that is provided in the bearing housing 23. At this time, a seal member 104 having a ring shape is interposed between the outer peripheral surface of the lubricant supply pipe 61 and the inner peripheral surface of the first supply flow path 51, and in the flange part 112, the lower surface on one end portion side adheres to the upper surface of the flange part 113 of the cooling water supply pipe 81 without any gap, and the lower surface on the other end portion side adheres to the upper surface of the cooling water discharge pipe 82 without any gap.

Further, in the bearing housing 23, a screw hole 105 is formed in a fixing surface 101*a* that rises adjacent to the mounting surface 101. Further, in the flange part 111, the position thereof in the circumferential direction is adjusted such that the contact portion 111*b* comes into contact with the outer peripheral surface of the lubricant supply pipe 61, and in the flange part 113, the position thereof in the circumferential direction is adjusted such that the contact portion 113*b* comes into contact with the outer peripheral surface of the lubricant supply pipe 61. At this time, the lower surface of the flange part 112 adheres to the upper surfaces of the flange parts 111 and 113 of the cooling water supply pipe 81 and the cooling water discharge pipe 82 without any gap. Then, a fastening bolt 114 penetrates the mounting hole 112*b* of the flange part 112 and is screwed into the screw hole 105.

Therefore, the lubricant supply pipe 61 is connected to the bearing housing 23 by fixing the flange part 112 to the fixing surface 101*a* via the fastening bolt 114. In the cooling water supply pipe 81 and the cooling water discharge pipe 82, the flange parts 111 and 113 overlap below the flange part 112 of the lubricant supply pipe 61 and are pressed in the insertion direction of each of the pipes 81 and 82. Further, in the cooling water supply pipe 81 and the cooling water discharge pipe 82, the contact portions 111*b* and 113*b* of the flange parts 111 and 113 come into contact with the outer peripheral surface of the lubricant supply pipe 61 to prevent the rotation of the cooling water supply pipe 81 and the cooling water discharge pipe 82. Therefore, the cooling water supply pipe 81 and the cooling water discharge pipe 82 are connected to the bearing housing 23 by fixing the flange parts 111 and 113 via the flange part 112 of the lubricant supply pipe 61.

In this manner, the supercharger of the first embodiment includes the housing 11 (the bearing housing 23), the rotary shaft 14 that is rotatably supported inside the housing 11, the compressor wheel 33 (the compressor 13) that is provided at one end portion in the axial direction of the rotary shaft 14, the cooling water supply pipe 81 and the cooling water discharge pipe 82 that have the flange parts 111 and 112 at the end portions 81*a* and 83*a* and that are connected to the housing 11, and the lubricant supply pipe 61 that has the flange part 112 at the end portion 61*a* and that is connected to the housing 11, the end portions 81*a* and 82*a* of the cooling water supply pipe 81 and the cooling water discharge pipe 82 are inserted into the cooling water supply flow path 73 and the cooling water discharge flow path 74 of the housing 11, the end portion 61*a* of the lubricant supply pipe 61 is inserted into the first supply flow path 51 of the housing 11, and the flange part 112 presses the flange parts 111 and 113 in the insertion direction and is fixed to the housing 11.

Therefore, the lubricant supply pipe 61 is fixed to the housing 11 through the flange part 112, the flange part 113 is pressed by the flange part 112 of the lubricant supply pipe 61 fixed to the housing 11, so that the cooling water supply pipe 81 is fixed, and the flange part 111 is pressed by the flange part 112 of the lubricant supply pipe 61 fixed to the housing 11, so that the cooling water discharge pipe 82 is fixed. Therefore, it is possible to eliminate the need for fastening bolts or the like for fixing the flange parts 111 and 113 of the cooling water supply pipe 81 and the cooling water discharge pipe 82 to the housing 11. As a result, the plurality of pipes 61, 81, and 82 can be integrated and connected to the housing 11, and an increase in cost can be suppressed by suppressing an increase in the size of the housing 11, the occurrence of processing work on the mounting surface 101, or the like.

In the supercharger of the first embodiment, the rotary shaft 14 is rotatably supported by the housing 11 through the bearings 24, 25, and 26, the lubricant supply flow path 42 and the lubricant discharge flow path 43 communicating with the bearings 24, 25, and 26 are provided, the housing 11 is provided with the cooling water annular flow path 72 around the rotary shaft 14, the cooling water supply flow path 73 and the cooling water discharge flow path 74 communicating with the cooling water annular flow path 72 are provided, and the lubricant supply pipe 61 that is connected to the first supply flow path 51 of the lubricant supply flow path 42, and the cooling water supply pipe 81 and the cooling water discharge pipe 82 that are connected to the cooling water supply flow path 73 and the cooling water discharge flow path 74 are integrated at one location of the housing 11. Therefore, it is possible to suppress an increase in cost by suppressing an increase in the size of the housing 11, the occurrence of processing work on the mounting surface 101, or the like.

In the supercharger of the first embodiment, the flange part 112 of the lubricant supply pipe 61 and the flange parts 111 and 113 of the cooling water supply pipe 81 and the cooling water discharge pipe 82 overlap in the thickness direction thereof, and only the flange part 112 on the upper side is fixed to the housing 11. Therefore, only the flange part 112 is fixed to the housing 11, so that the lubricant supply pipe 61 can be connected to the housing 11, and the flange part 112 presses the flange parts 111 and 113, so that the cooling water supply pipe 81 and the cooling water discharge pipe 82 can be connected to the housing 11. Therefore, the connection portions of the plurality of pipes 61, 81, and 82 with respect to the housing 11 can be simplified.

In the supercharger of the first embodiment, the contact portions 111*b* and 113*b* are provided as rotation prevention mechanisms for preventing the rotation of the cooling water supply pipe 81 with respect to the housing 11. Therefore, the cooling water supply pipe 81 and the cooling water discharge pipe 82 are prevented from becoming detached by the flange part 112 of the lubricant supply pipe 61 and are prevented from rotating by the rotation prevention mechanisms. Therefore, the cooling water supply pipe 81 and the cooling water discharge pipe 82 can be firmly connected to the housing 11.

In the supercharger of the first embodiment, as the rotation prevention mechanisms, the contact portions 111*b* and 113*b* that come into contact with the lubricant supply pipe 61 are provided in the flange parts 111 and 113 of the cooling water supply pipe 81 and the cooling water discharge pipe 82. Therefore, the rotation of the cooling water supply pipe 81 and the cooling water discharge pipe 82 can be easily prevented without changing the structure of the cooling water supply pipe 81.

In the first embodiment, a configuration is made such that the flange part 112 of the lubricant supply pipe 61 is fixed to the bearing housing 23 by the fastening bolt 114, so that the flange part 112 presses the flange parts 111 and 113 of the cooling water supply pipe 81 and the cooling water discharge pipe 82. However, there is no limitation to this configuration. For example, a configuration may be made such that the flange part 111 of the cooling water discharge pipe 82 and the flange part 112 of the lubricant supply pipe 61 overlap in the thickness direction thereof and both the flange parts 111 and 112 are fixed to the housing 11 by individual fastening bolts.

In the supercharger of the first embodiment, the lubricant supply pipe 61, the cooling water supply pipe 81, and the cooling water discharge pipe 82 are parallel to each other and are fixed to the housing 11. Therefore, since the first supply flow path 51, the cooling water supply flow path 73, and the cooling water discharge flow path 74 are parallel to each other, the processing of each of the flow paths 51, 73, and 74 with respect to the housing 11 is simplified, so that it is possible to improve the workability and to improve the ease-of-assembly of each of the pipes 61, 81, and 82 to each of the flow paths 51, 73, and 74.

In the supercharger of the first embodiment, the mounting surface 101 on which the first supply flow path 51, the cooling water supply flow path 73, and the cooling water discharge flow path 74 are formed is a continuous flat surface without a step. Therefore, it is possible to facilitate the processing of the mounting surface 101 and to improve the workability.

In the supercharger of the first embodiment, the flange part 111 of the cooling water discharge pipe 82 and the flange part 112 of the lubricant supply pipe 61 overlap in the thickness direction, the flange part 113 of the cooling water supply pipe 81 and the flange part 112 of the lubricant supply pipe 61 overlap in the thickness direction, the fastening bolt 114 penetrates the flange part 112 and is screwed to the housing 11 to fix the lubricant supply pipe 61 to the housing 11, the flange part 112 of the lubricant supply pipe 61 presses the flange parts 111 and 113 of the cooling water supply pipe 81 and the cooling water discharge pipe 82 in the insertion direction, and the contact portions 111*b* and 113*b* are provided as rotation prevention mechanisms for preventing the rotation of the cooling water supply pipe 81 and the cooling water discharge pipe 82 with respect to the housing 11. Therefore, three or more pipes 61, 81, and 82 can be integrated and connected to the housing 11, and an increase in cost can be suppressed by suppressing an increase in the size of the housing 11, the occurrence of processing work on the mounting surface 101, or the like.

In the supercharger of the first embodiment, the exhaust turbine supercharger 10 is provided in which the turbine wheel 31 (the turbine 12) is provided at one end portion in the axial direction of the rotary shaft 14 and the compressor wheel 33 (the compressor 13) is provided at the other end portion in the axial direction. Therefore, in the exhaust turbine supercharger 10, the plurality of pipes 61, 81, and 82 can be integrated and connected to the housing 11, and an increase in cost can be suppressed by suppressing an increase in the size of the housing 11, the occurrence of processing work on the mounting surface, or the like.

A method for connecting a pipe in the supercharger of the first embodiment includes a step of inserting the end portions 81*a* and 82*a* of the cooling water supply pipe 81 and the cooling water discharge pipe 82 into the cooling water supply flow path 73 and the cooling water discharge flow path 74 of the housing 11, a step of inserting the end portion 61*a* of the lubricant supply pipe 61 into the first supply flow path 51 of the housing 11, and a step of pressing the flange parts 111 and 113 in the insertion direction via the flange part 112 to fix the flange parts 111 and 113 to the housing 11.

Therefore, the plurality of pipes 61, 81, and 82 can be integrated and connected to the housing 11, and an increase in cost can be suppressed by suppressing an increase in the size of the housing 11, the occurrence of processing work on the mounting surface 101, or the like.

Second Embodiment

Figure 8:
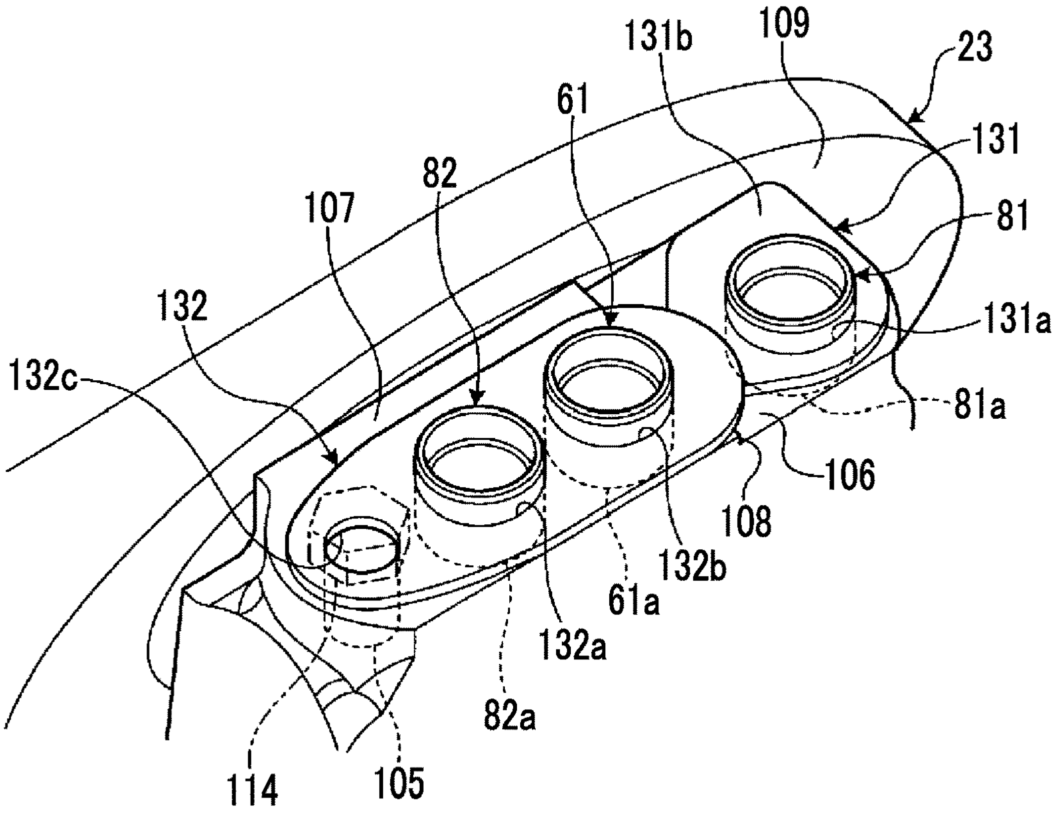
FIG. 8 is a perspective view showing a connection portion of a pipe with respect to a housing in an exhaust turbine supercharger of a second embodiment.

FIG. 8 is a perspective view showing a connection portion of a pipe with respect to a housing in an exhaust turbine supercharger of a second embodiment. The basic configuration of the present embodiment is the same as that of the first embodiment described above and will be described using FIGS. 1 to 3, and members having the same functions as those in the first embodiment are denoted by the same reference numerals, and detailed description thereof will be omitted.

In the second embodiment, as shown in FIGS. 1 to 3, in the bearing housing 23 of the exhaust turbine supercharger 10, mounting surfaces 106 and 107 are formed on the upper portion of the outer peripheral surface, and the mounting surfaces 106 and 107 are flat surfaces having a step 108 therebetween. That is, the second mounting surface 107 is a flat surface far from the first mounting surface 106 on an axis side of the rotary shaft 14, and the step 108 is provided between the first mounting surface 106 and the second mounting surface 107. Then, the cooling water supply flow path 73 is formed on the first mounting surface 106, and the first supply flow path 51 configuring the lubricant supply flow path 42 and the cooling water discharge flow path 74 are formed on the second mounting surface 107. At this time, the first supply flow path 51, the cooling water supply flow path 73, and the cooling water discharge flow path 74 are orthogonal to the mounting surfaces 106 and 107. Further, the cooling water supply flow path 73, the first supply flow path 51, and the cooling water discharge flow path 74 are provided side by side in order along the horizontal direction intersecting the axial direction of the rotary shaft 14. Then, the lubricant supply pipe 61 is connected to the first supply flow path 51, the cooling water supply pipe 81 is connected to the cooling water supply flow path 73, and the cooling water discharge pipe 82 is connected to the cooling water discharge flow path 74.

As shown in FIG. 8, in the cooling water supply pipe 81 as a first pipe, a flange part 131 as a first mounting flange is fixed to the end portion 81*a* that is connected to the bearing housing 23. In the cooling water discharge pipe 82 as a second pipe and the lubricant supply pipe 61 as a second pipe, a flange part 132 as a second mounting flange is fixed to the end portions 82*a* and 61*a* that are connected to the bearing housing 23. That is, in the second embodiment, a plurality of (in the present embodiment, two) second pipes are provided, and the flange part 132 as a common second mounting flange is fixed to the end portions 82*a* and 61*a* of the cooling water discharge pipe 82 and the lubricant supply pipe 61 as the second pipes.

The flange part 131 has a rectangular shape, and the cooling water supply pipe 81 is penetrated and fixed to a through-hole 131*a*, and a contact portion 131*b* as a rotation prevention mechanism is formed on the outer peripheral portion. The contact portion 131*b* is for preventing the rotation of the cooling water supply pipe 81 with respect to the bearing housing 23, and has a planar shape following a restricting surface 109 of the bearing housing 23. The restricting surface 109 is a surface orthogonal to the rotary shaft 14 (refer to FIG. 1) in the axial direction. The flange part 132 has an oval shape, and the cooling water discharge pipe 82 and the lubricant supply pipe 61 are penetrated and fixed to through-holes 132*a* and 132*b* formed in the central portion and on one end portion side, and a mounting hole 132*c* is formed on the other end portion side.

The end portion 81*a* of the cooling water supply pipe 81 is inserted into the cooling water supply flow path 73 (refer to FIG. 3) that is provided in the bearing housing 23, and the lower surface of the flange part 131 adheres to the first mounting surface 106 of the bearing housing 23 without any gap. Further, the end portion 82*a* of the cooling water discharge pipe 82 is inserted into the cooling water discharge flow path 74 (refer to FIG. 3) that is provided in the bearing housing 23, and the end portion 61*a* of the lubricant supply pipe 61 is inserted into the first supply flow path 51 (refer to FIG. 2) provided in the bearing housing 23. At this time, the lower surface on one end portion side of the flange part 132 adheres to the upper surface of the flange part 131 of the cooling water supply pipe 81 without any gap, and the other lower surface adheres to the second mounting surface 107 of the bearing housing 23 without any gap.

Further, in the bearing housing 23, the screw hole 105 is formed at a predetermined position. The position in the circumferential direction of the mounting hole 132*c* of the flange part 132 is adjusted so as to overlap the screw hole 105, and the fastening bolt 114 penetrates the mounting hole 132*c* of the flange part 132 and is screwed into the screw hole 105. Further, the contact portion 131*b* of the flange part 131 comes into contact with the restricting surface 109 of the bearing housing 23.

Therefore, the cooling water discharge pipe 82 and the lubricant supply pipe 61 are connected to the bearing housing 23 by fixing the common flange part 132 to the second mounting surface 107 by the fastening bolt 114. In the cooling water supply pipe 81, the flange part 131 is overlapped below the flange part 132 and is pressed in the insertion direction. Further, in the cooling water supply pipe 81, the contact portion 131*b* of the flange part 131 comes into contact with the restricting surface 109 of the bearing housing 23 to prevent the rotation of the cooling water supply pipe 81. Therefore, the cooling water supply pipe 81 is connected to the bearing housing 23 by fixing the flange part 131 to the first mounting surface 106 by means of the bearing housing 23 and the flange part 132.

Figure 9:
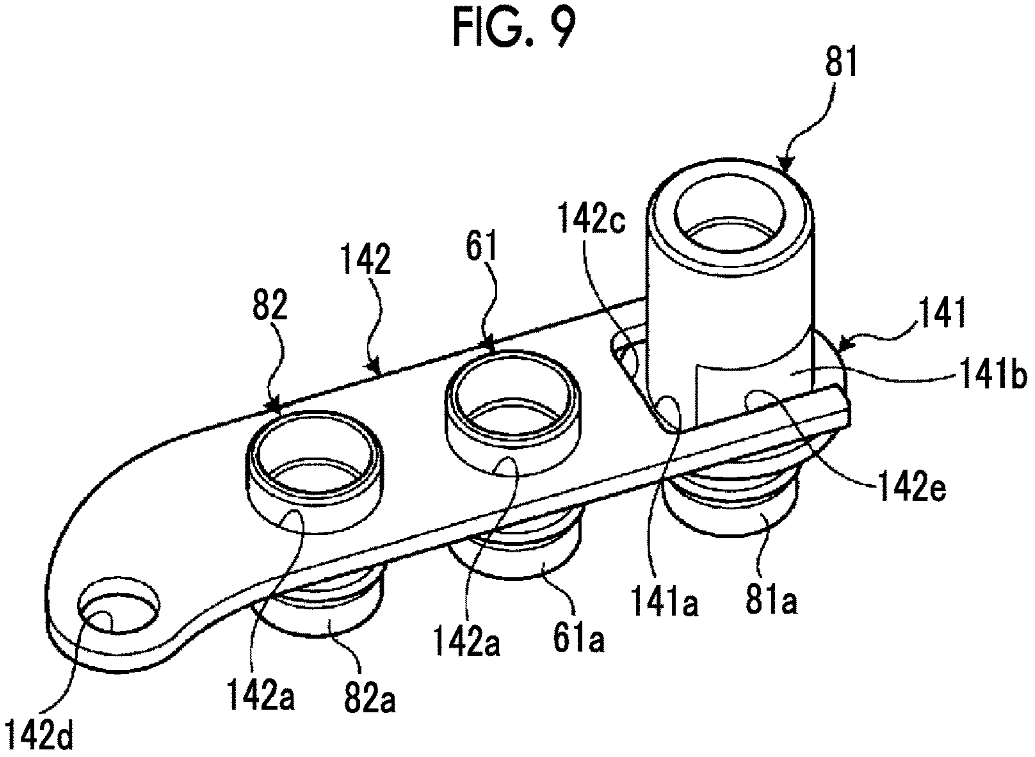
FIG. 9 is a perspective view showing a connection portion of a pipe in a first modification example of the second embodiment.

The rotation prevention mechanism of the cooling water supply pipe 81 is not limited to that described above. FIG. 9 is a perspective view showing a connection portion of a pipe in a first modification example of the second embodiment, and FIG. 10 is a perspective view showing a connection portion of a pipe in a second modification example of the second embodiment.

In the first modification example of the second embodiment, as shown in FIG. 9, a flange part 141 is fixed to the end portion 81*a* of the cooling water supply pipe 81. A flange part 142 is fixed to the end portions 82*a* and 61*a* of the cooling water discharge pipe 82 and the lubricant supply pipe 61. The flange part 141 has a circular shape, and the cooling water supply pipe 81 is penetrated and fixed to a through-hole 141*a*. The cooling water supply pipe 81 has a contact portion 141*b* as a rotation prevention mechanism formed on the outer peripheral surface. The flange part 142 has a long plate shape, and the cooling water discharge pipe 82 and the lubricant supply pipe 61 are penetrated and fixed to through-holes 142*a* and 142*b* formed in the central portion, a groove portion 142*c* is formed on one end portion side, and a mounting hole 142*d* is formed on the other end portion side. The contact portion 141*b* of the cooling water supply pipe 81 is for preventing the rotation of the cooling water supply pipe 81 with respect to the bearing housing 23 (refer to FIG. 8), and has a planar shape following an inner surface 142*e* of the groove portion 142*c* of the flange part 142.

Therefore, when the cooling water supply pipe 81, the cooling water discharge pipe 82, and the lubricant supply pipe 61 are connected to the bearing housing 23, the cooling water discharge pipe 82 and the lubricant supply pipe 61 are connected to the bearing housing 23 by fixing the common flange part 142 with the fastening bolt 114 (refer to FIG. 8). In the cooling water supply pipe 81, the flange part 141 is overlapped below the flange part 142 and is pressed in the insertion direction. Further, in the cooling water supply pipe 81, the contact portion 141*b* comes into contact with the inner surface 142*e* of the flange part 142 to prevent the rotation of the cooling water supply pipe 81. Then, the cooling water supply pipe 81 is connected to the bearing housing 23 by fixing the flange part 141 via the flange part 142.

Figure 10:
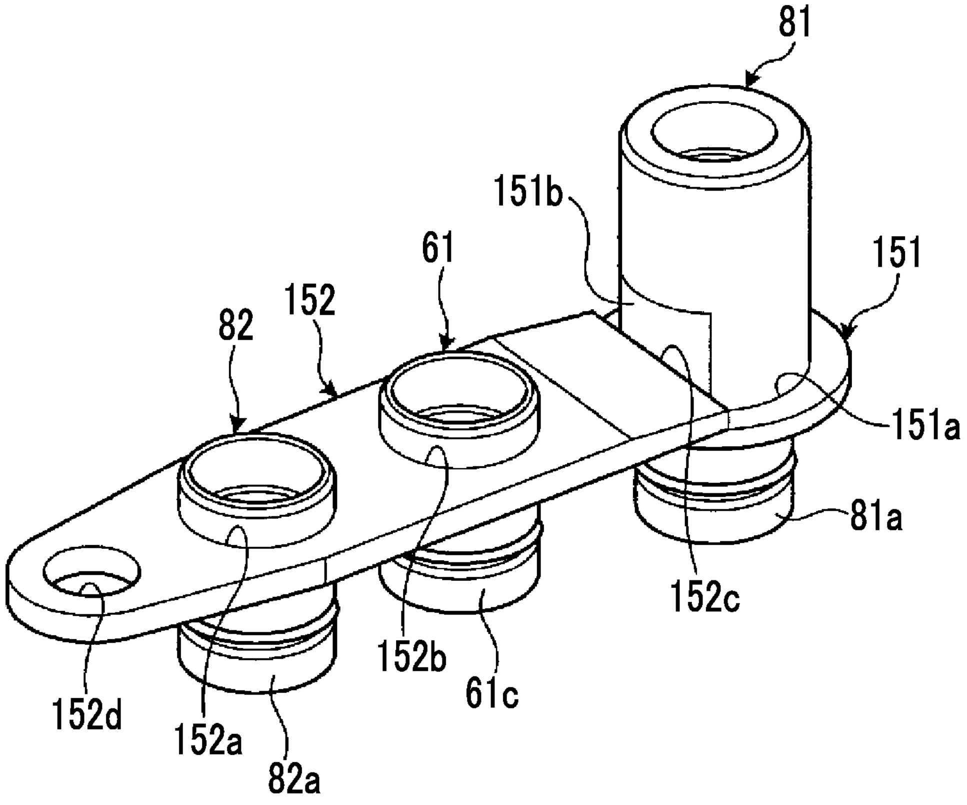
FIG. 10 is a perspective view showing a connection portion of a pipe in a second modification example of the second embodiment.

In the second modification example of the second embodiment, as shown in FIG. 10, a flange part 151 is fixed to the end portion 81*a* of the cooling water supply pipe 81. A flange part 152 is fixed to the end portions 82*a* and 61*a* of the cooling water discharge pipe 82 and the lubricant supply pipe 61. The flange part 151 has a circular shape, and the cooling water supply pipe 81 is penetrated and fixed to a through-hole 151*a*. The cooling water supply pipe 81 has a contact portion 151*b* as a rotation prevention mechanism formed on the outer peripheral surface. The flange part 152 has a long plate shape, and the cooling water discharge pipe 82 and the lubricant supply pipe 61 are penetrated and fixed to through-holes 152*a* and 152*b* formed in the central portion, an end surface 152*c* is formed on one end portion side, and a mounting hole 152*d* is formed on the other end portion side. The contact portion 151*b* of the cooling water supply pipe 81 is for preventing the rotation of the cooling water supply pipe 81 with respect to the bearing housing 23 (refer to FIG. 8), and has a planar shape following the end surface 152*c* of the flange part 152.

Therefore, when the cooling water supply pipe 81, the cooling water discharge pipe 82, and the lubricant supply pipe 61 are connected to the bearing housing 23, the cooling water discharge pipe 82 and the lubricant supply pipe 61 are connected to the bearing housing 23 by fixing the common flange part 152 with the fastening bolt 114 (refer to FIG. 8). In the cooling water supply pipe 81, the flange part 151 is overlapped below the flange part 152 and is pressed in the insertion direction. Further, in the cooling water supply pipe 81, the contact portion 151*b* comes into contact with the end surface 152*c* of the flange part 152 to prevent the rotation of the cooling water supply pipe 81. Then, the cooling water supply pipe 81 is connected to the bearing housing 23 by fixing the flange part 151 via the flange part 152.

In this manner, in the supercharger of the second embodiment, the flange part 131 (141 or 151) is provided at the end portion 81*a* of the cooling water supply pipe 81, the common flange part 132 (142 or 152) is provided at the end portions 82*a* and 61*a* of the cooling water discharge pipe 82 and the lubricant supply pipe 61, the end portion 81*a* of the cooling water supply pipe 81 is inserted into the cooling water supply flow path 73 of the housing 11, the end portion 82*a* of the cooling water discharge pipe 82 is inserted into the cooling water discharge flow path 74 of the housing 11, the end portion 61*a* of the lubricant supply pipe 61 is inserted into the first supply flow path 51 of the housing 11, and the flange part 132 (142 or 152) presses the flange part 131 (141 or 151) in the insertion direction and is fixed to the housing 11.

Therefore, the common flange part 132 is provided at the end portions 82*a* and 61*a* of the plurality of pipes 82 and 61, and thus it is possible to connect the plurality of pipes 81, 82, and 61 to the housing 11 merely by fixing one flange part 132 to the housing 11. Therefore, the structure can be simplified and the workability can be improved.

In the supercharger of the second embodiment, as the rotation prevention mechanism, the flange part 131 is provided with the contact portion 131*b* which comes into contact with the restricting surface 109 of the housing 11. Therefore, the rotation of the cooling water supply pipe 81 can be easily prevented without changing the structure of the cooling water supply pipe 81.

In the supercharger of the second embodiment, as the rotation prevention mechanism, the cooling water supply pipe 81 is provided with the contact portion 141*b* (151*b*) which comes into contact with the flange part 142 (152). Therefore, the rotation of the cooling water supply pipe 81 can be easily prevented without changing the structure of the flange part 142 of the cooling water supply pipe 81.

In the supercharger of the second embodiment, the first mounting surface 106 of the housing 11, in which the cooling water supply flow path 73 is formed, and the second mounting surface 107 of the housing 11, in which the cooling water discharge flow path 74 and the first supply flow path 51 are formed, are flat surfaces having the step 108 therebetween, the flange part 131 (141, 151) comes into contact with the first mounting surface 106, and the flange part 132 (142, 152) comes into contact with the second mounting surface 107. Therefore, even if there is the step 108 between the first mounting surface 106 and the second mounting surface 107, by bringing the flange part 131 (141, 151) into contact with the first mounting surface 106 and bringing the flange part 132 (142, 152) into contact with the second mounting surface 107, it is possible to connect the plurality of pipes 81, 82, and 61 to the housing 11 and to integrate and connect the plurality of pipes 81, 82, and 61 to the housing 11 regardless of the shape of the housing 11.

In the second embodiment, the common flange part 132 (142, 152) is provided at the cooling water discharge pipe 82 and at the lubricant supply pipe 61 as a plurality of second pipes in the present invention. However, a common flange part may be provided at the end portions of a plurality of first pipes in the present invention.

Third Embodiment

Figure 11:
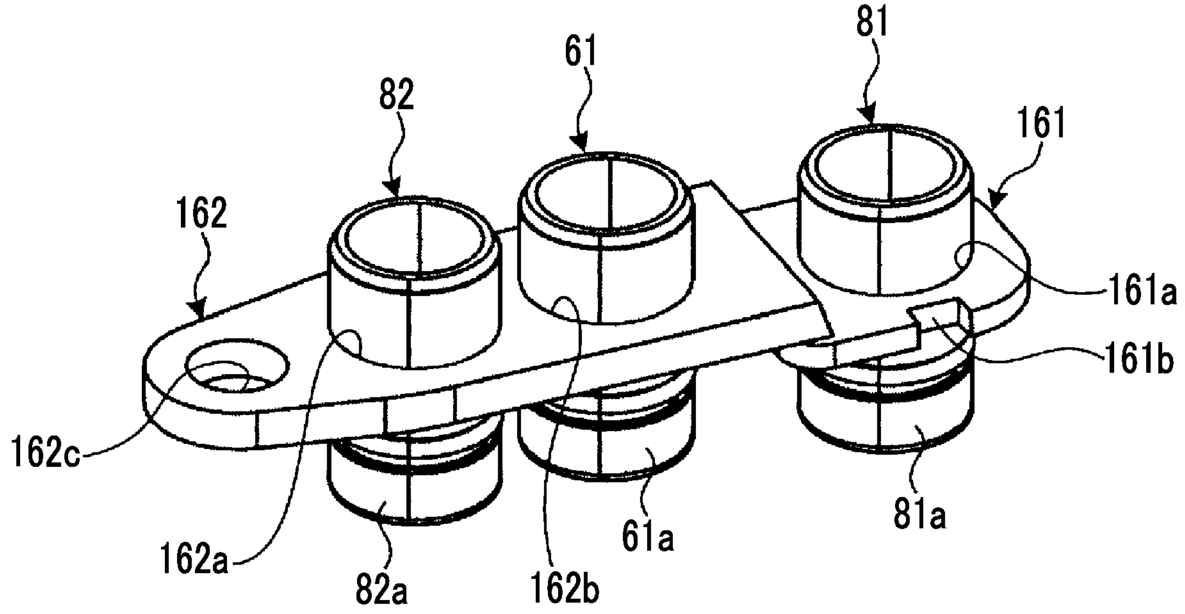
FIG. 11 is a perspective view showing a connection portion of a pipe in an exhaust turbine supercharger of a third embodiment.
Figure 12:
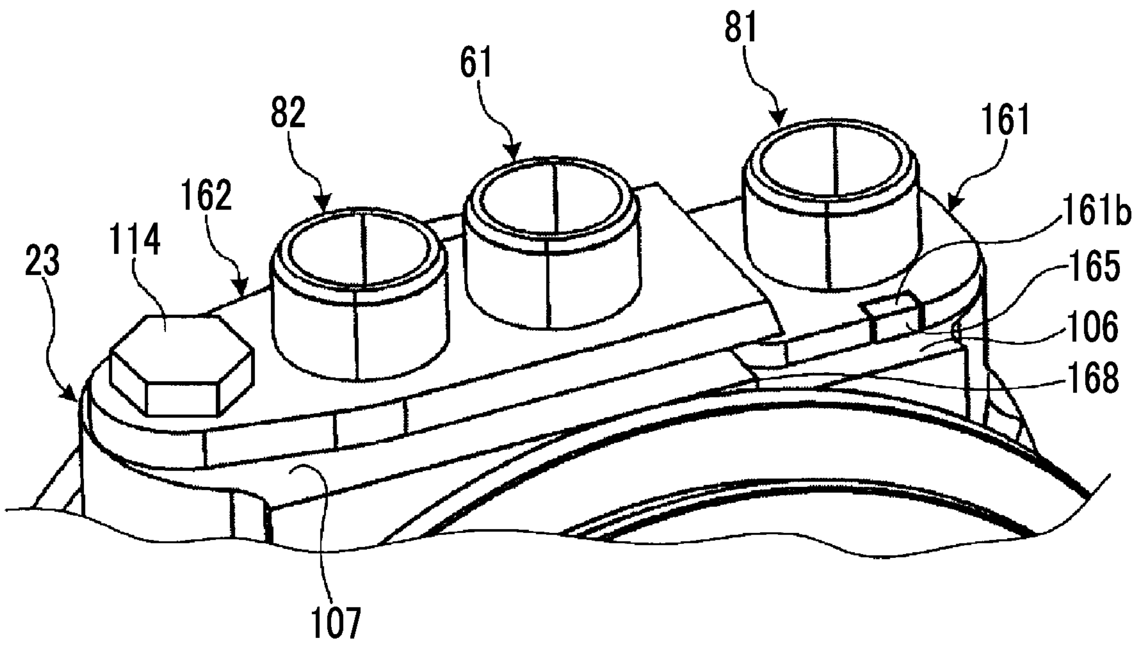
FIG. 12 is a perspective view showing a connection portion of a pipe with respect to a housing.

FIG. 11 is a perspective view showing a connection portion of a pipe in an exhaust turbine supercharger of a third embodiment, and FIG. 12 is a perspective view showing the connection portion of the pipe with respect to the housing. Members having the same functions as those in the first embodiment are denoted by the same reference numerals, and detailed description thereof will be omitted.

In the third embodiment, as shown in FIGS. 11 and 12, in the bearing housing 23 of the exhaust turbine supercharger, the first mounting surface 106 and the second mounting surface 107 are formed on an upper portion of the outer peripheral surface, and the step 108 is provided between the first mounting surface 106 and the second mounting surface 107. Then, the first supply flow path 51 (refer to FIG. 2) and the cooling water supply flow path 73 (refer to FIG. 3) are formed on the first mounting surface 106, and the cooling water discharge flow path 74 (refer to FIG. 3) and the first supply flow path 51 are formed on the second mounting surface 107.

In the cooling water supply pipe 81, a flange part 161 as a first mounting flange is fixed to the end portion 81*a*. In the cooling water discharge pipe 82 and the lubricant supply pipe 61, a common flange part 162 as a second mounting flange is fixed to the end portions 82*a* and 61*a*.

The flange part 161 has a rectangular shape, and the cooling water supply pipe 81 is penetrated and fixed to a through-hole 161*a*, and a contact portion 161*b* as a rotation prevention mechanism is formed in the outer peripheral portion. The contact portion 161*b* is for preventing the rotation of the cooling water supply pipe 81 with respect to the bearing housing 23, and is formed as a cutout portion. The bearing housing 23 has a protrusion 165 formed on the second mounting surface 107, and the contact portion 161*b* can come into contact with the protrusion 165. The flange part 162 has a long plate shape, and the cooling water discharge pipe 82 and the lubricant supply pipe 61 are penetrated and fixed to through-holes 162*a* and 162*b* formed in the central portion and on one end portion side, and a mounting hole 162*c* is formed on the other end portion side.

The end portion 81*a* of the cooling water supply pipe 81 is inserted into the cooling water supply flow path 73 of the bearing housing 23, and the lower surface of the flange part 161 adheres to the first mounting surface 106 of the bearing housing 23 without any gap. The end portion 82*a* of the cooling water discharge pipe 82 is inserted into the cooling water discharge flow path 74 of the bearing housing 23, and the end portion 61*a* of the lubricant supply pipe 61 is inserted into the first supply flow path 51 of the bearing housing 23. At this time, the lower surface on one end portion side of the flange part 162 adheres to the upper surface of the flange part 161 of the cooling water supply pipe 81 without any gap, and the other lower surface adheres to the second mounting surface 107 of the bearing housing 23 without any gap. Further, the fastening bolt 114 penetrates the mounting hole 162*c* of the flange part 162 and is screwed into the screw hole 105. Further, in the flange part 161, the contact portion 161*b* comes into contact with the protrusion 165 formed on the first mounting surface 106 of the bearing housing 23.

Therefore, the cooling water discharge pipe 82 and the lubricant supply pipe 61 are connected to the bearing housing 23 by fixing the common flange part 162 to the second mounting surface 107 via the fastening bolt 114. In the cooling water supply pipe 81, the flange part 161 is overlapped below the flange part 162 and is pressed in the insertion direction. Further, in the cooling water supply pipe 81, the contact portion 161*b* of the flange part 161 comes into contact with the protrusion 165 of the bearing housing 23 to prevent the rotation of the cooling water supply pipe 81. Therefore, the cooling water supply pipe 81 is connected to the bearing housing 23 by being fixed to the first mounting surface 106 by means of the bearing housing 23 and the flange part 162.

In this manner, in the supercharger of the third embodiment, the flange part 161 is provided at the end portion 81*a* of the cooling water supply pipe 81, the common flange part 162 is provided at the end portions 82*a* and 61*a* of the cooling water discharge pipe 82 and the lubricant supply pipe 61, the end portion 81*a* of the cooling water supply pipe 81 is inserted into the cooling water supply flow path 73 of the housing 11, the end portion 82*a* of the cooling water discharge pipe 82 is inserted into the cooling water discharge flow path 74 of the housing 11, the end portion 61*a* of the lubricant supply pipe 61 is inserted into the first supply flow path 51 of the housing 11, the flange part 162 presses the flange part 161 in the insertion direction and is fixed to the housing 11, and the contact portion 161*b* of the flange part 161 comes into contact with the protrusion 165 of the housing 11.

Therefore, the common flange part 162 is provided at the end portions 82*a* and 61*a* of the plurality of pipes 82 and 61, and thus it is possible to connect the plurality of pipes 81, 82, and 61 to the housing 11 merely by fixing one flange part 162 to the housing 11. Therefore, the structure can be simplified and the workability can be improved.

Fourth Embodiment

Figure 13:
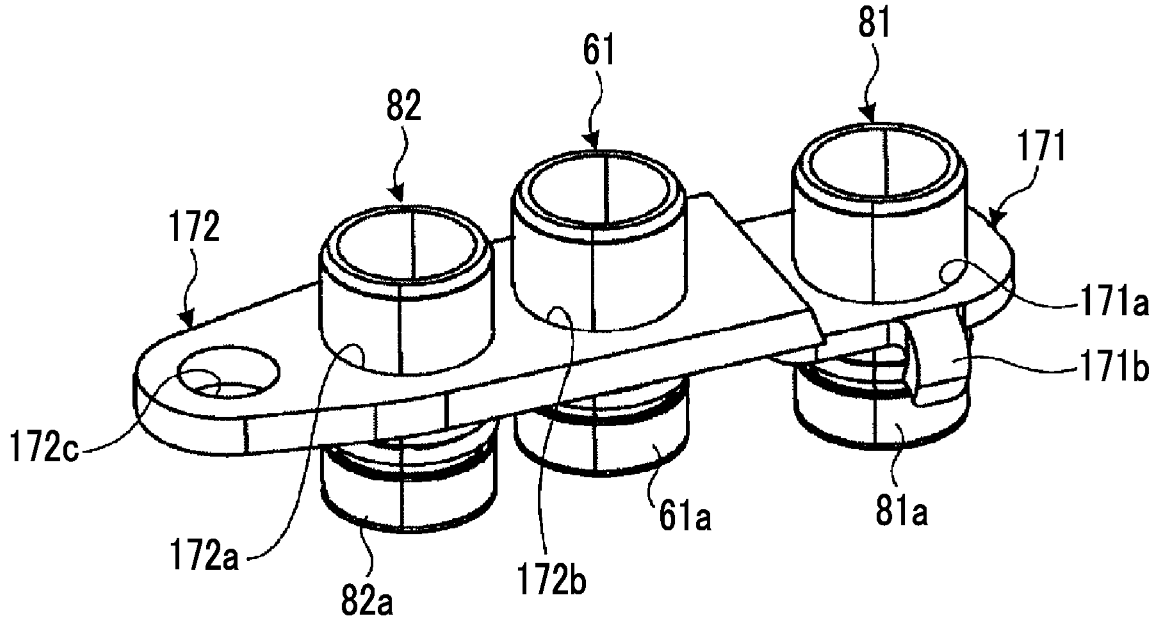
FIG. 13 is a perspective view showing a connection portion of a pipe in an exhaust turbine supercharger of a fourth embodiment.
Figure 14:
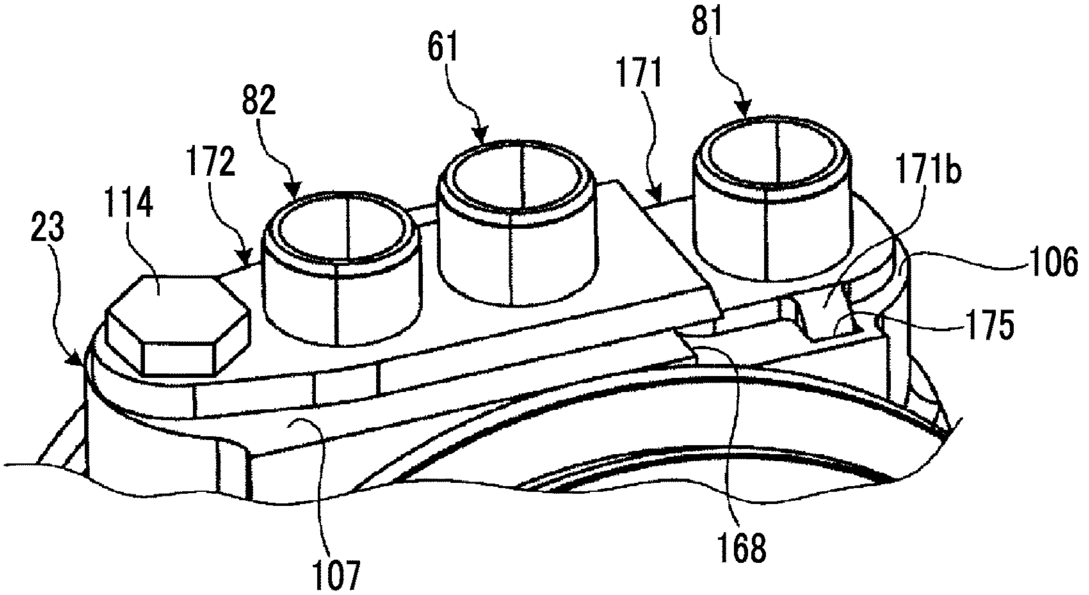
FIG. 14 is a perspective view showing a connection portion of a pipe with respect to a housing.
Figure 15:
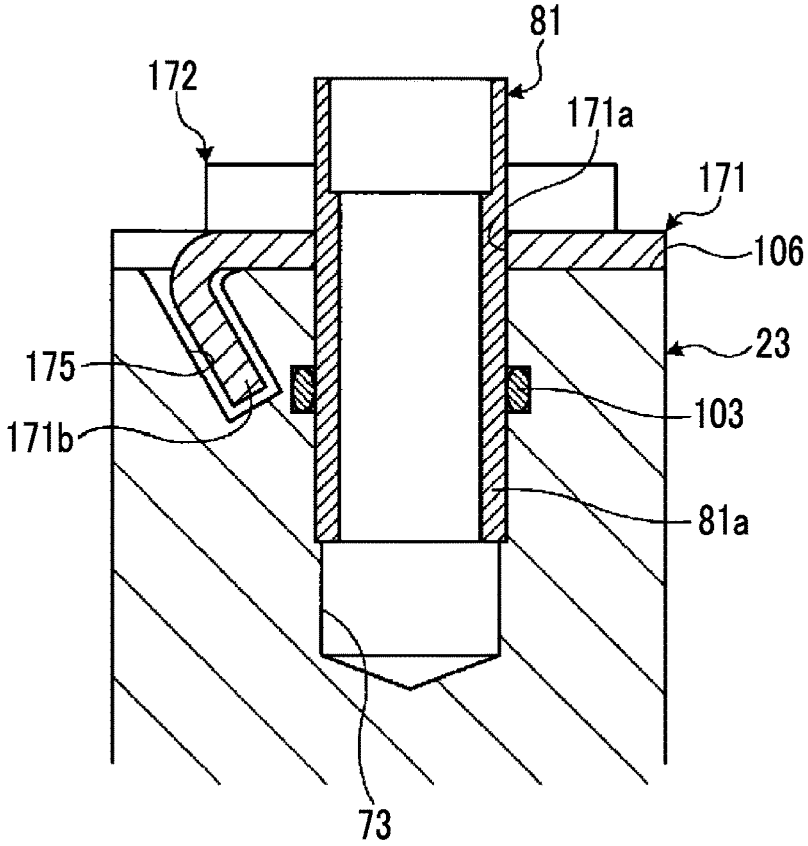
FIG. 15 is a sectional view showing a connection portion of a pipe.

FIG. 13 is a perspective view showing a connection portion of a pipe in an exhaust turbine supercharger of a fourth embodiment, FIG. 14 is a perspective view showing the connection portion of the pipe with respect to the housing, and FIG. 15 is a sectional view showing a connection portion of the pipe. Members having the same functions as those in the first embodiment are denoted by the same reference numerals, and detailed description thereof will be omitted.

In the fourth embodiment, as shown in FIGS. 13 and 14, a flange part 171 is fixed to the end portion 81*a* of the cooling water supply pipe 81. A flange part 172 is fixed to the end portions 82*a* and 61*a* of the cooling water discharge pipe 82 and the lubricant supply pipe 61. The flange part 171 has a rectangular shape, and the cooling water supply pipe 81 is penetrated and fixed to a through-hole 171*a*, and a contact portion 171*b* as a rotation prevention mechanism is formed at the outer peripheral portion. The contact portion 171*b* is for preventing the rotation of the cooling water supply pipe 81 with respect to the bearing housing 23, and is formed in a claw shape. The bearing housing 23 has a recessed portion 175 formed on the second mounting surface 107, and the contact portion 171*b* can come into contact with the recessed portion 175. The flange part 172 has a long plate shape, and the cooling water discharge pipe 82 and the lubricant supply pipe 61 are penetrated and fixed to through-holes 172*a* and 172*b* formed in the central portion and on one end portion side, and a mounting hole 172*c* is formed on the other end portion side.

The end portion 81*a* of the cooling water supply pipe 81 is inserted into the cooling water supply flow path 73 of the bearing housing 23, and the lower surface of the flange part 171 adheres to the first mounting surface 106 of the bearing housing 23 without any gap. The end portion 82*a* of the cooling water discharge pipe 82 is inserted into the cooling water discharge flow path 74 of the bearing housing 23, and the end portion 61*a* of the lubricant supply pipe 61 is inserted into the first supply flow path 51 of the bearing housing 23. At this time, the lower surface on one end portion side of the flange part 172 adheres to the upper surface of the flange part 171 of the cooling water supply pipe 81 without any gap, and the other lower surface adheres to the second mounting surface 107 of the bearing housing 23 without any gap. Further, the fastening bolt 114 penetrates the mounting hole 172*c* of the flange part 172 and is screwed into the screw hole 105. Further, in the flange part 171, the contact portion 171*b* comes into contact with the recessed portion 175 formed on the first mounting surface 106 of the bearing housing 23.

As shown in FIG. 15, the contact portion 171*b* is formed by bending a protrusion piece protruding outward from the outer peripheral portion of the flange part 171 toward the second mounting surface 107 side at an angle larger than 90 degrees. On the other hand, the recessed portion 175 is formed from the second mounting surface 107 of the bearing housing 23 along an inclination direction approaching the cooling water supply flow path 73 with respect to the axial direction of the cooling water supply flow path 73. The bending direction of the contact portion 171*b* and the inclination direction of the recessed portion 175 are substantially the same. When the cooling water supply pipe 81 is inserted into the cooling water supply flow path 73 and the flange part 171 comes into contact with the second mounting surface 107, the contact portion 171*b* is elastically deformed to come into contact with the recessed portion 175. Here, the contact portion 171*b* comes into contact with the recessed portion 175, so that the cooling water supply pipe 81 is not only prevented from rotating with respect to the bearing housing 23, but also prevented from becoming detached.

Therefore, as shown in FIG. 14, the cooling water discharge pipe 82 and the lubricant supply pipe 61 are connected to the bearing housing 23 by fixing the common flange part 172 to the second mounting surface 107 via the fastening bolt 114. In the cooling water supply pipe 81, the flange part 171 is overlapped below the flange part 172 and is pressed in the insertion direction. Further, in the cooling water supply pipe 81, the contact portion 171*b* of the flange part 171 comes into contact with the recessed portion 175 of the bearing housing 23 to prevent the rotation of the cooling water supply pipe 81. Therefore, the cooling water supply pipe 81 is connected to the bearing housing 23 by being fixed to the first mounting surface 106 by means of the bearing housing 23 and the flange part 172.

In this manner, in the supercharger of the fourth embodiment, the flange part 171 is provided at the end portion 81*a* of the cooling water supply pipe 81, the common flange part 172 is provided at the end portions 82*a* and 61*a* of the cooling water discharge pipe 82 and the lubricant supply pipe 61, the end portion 81*a* of the cooling water supply pipe 81 is inserted into the cooling water supply flow path 73 of the housing 11, the end portion 82*a* of the cooling water discharge pipe 82 is inserted into the cooling water discharge flow path 74 of the housing 11, the end portion 61*a* of the lubricant supply pipe 61 is inserted into the first supply flow path 51 of the housing 11, the flange part 172 presses the flange part 171 in the insertion direction and is fixed to the housing 11, and the contact portion 171*b* of the flange part 171 comes into contact with the recessed portion 175 of the housing 11.

Therefore, the common flange part 172 is provided at the end portions 82*a* and 61*a* of the plurality of pipes 82 and 61, so that it is possible to connect the plurality of pipes 81, 82, and 61 to the housing 11 merely by fixing one flange part 172 to the housing 11. Therefore, the structure can be simplified and the workability can be improved.

Fifth Embodiment

Figure 16:
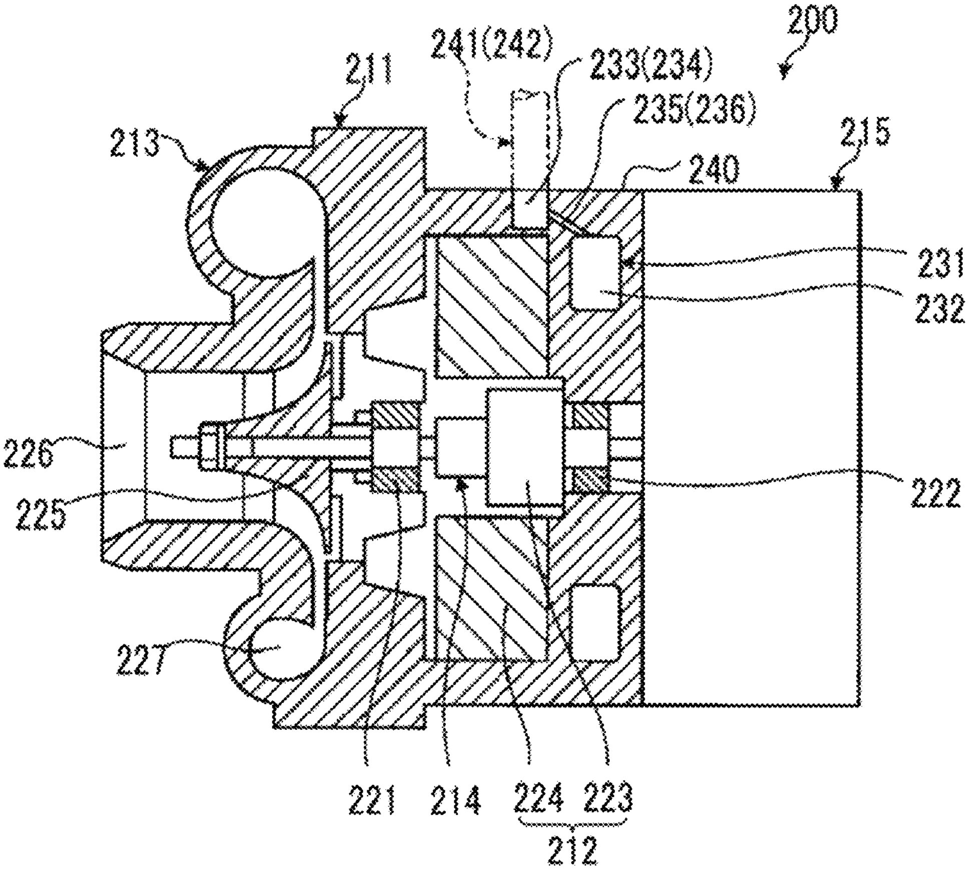
FIG. 16 is a sectional view showing an electric supercharger of a fifth embodiment.
Figure 17:
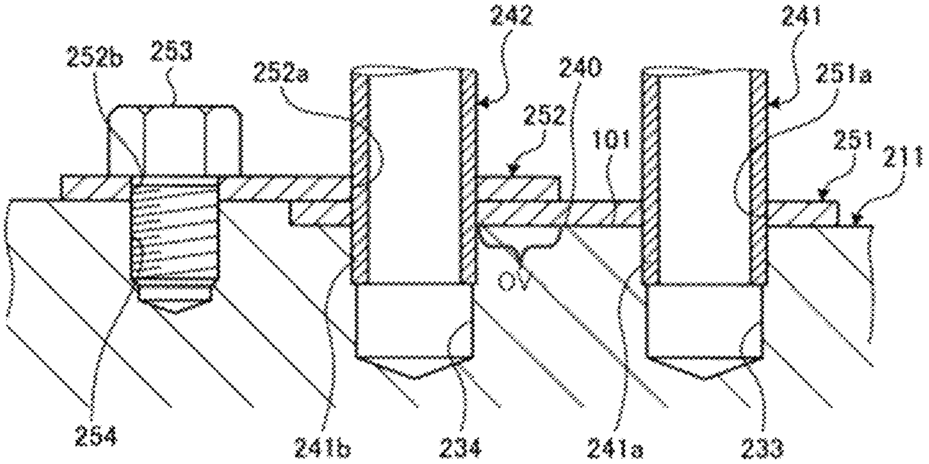
FIG. 17 is a sectional view showing a connection portion of a pipe with respect to a housing.

FIG. 16 is a sectional view showing an electric supercharger of a fifth embodiment, and FIG. 17 is a sectional view showing a connection portion of a pipe with respect to a housing.

As shown in FIG. 16, an electric supercharger 200 as the supercharger according to the present invention includes a housing 211, an electric motor 212, a compressor 213, a rotary shaft 214, and an inverter 215.

The housing 211 is formed so as to have a hollow inside in which the rotary shaft 214 is disposed, and the rotary shaft 214 is rotatably supported by bearings 221 and 222. A rotor 223 is fixed to the outer peripheral portion of the rotary shaft 214, while a stator 224 is fixed to the inner peripheral portion of the housing 211. The rotor 223 and the stator 224 face each other in the radial direction with a predetermined gap therebetween. The electric motor 212 is composed of the rotor 223 and the stator 224. Further, a compressor wheel 225 of the compressor 213 is fixed to one end portion in the axial direction of the rotary shaft 214. The housing 211 is provided with an air intake port 226 and a compressed air discharge port 227 with respect to the compressor wheel 225. Therefore, air as a combustion gas taken in from the air intake port 226 is compressed by the compressor wheel 225 that is driven and rotated, and is discharged as compressed air from the compressed air discharge port 227. Further, the rotary shaft 214 is provided with the inverter 215 at the other end portion in the axial direction.

In the electric supercharger 200 configured in this manner, the rotary shaft 214 is driven and rotated by the electric motor 212, the rotation of the rotary shaft 214 is transmitted to the compressor 13, so that the compressor 13 is driven, and the compressor 13 compresses air and supplies it to the intake system of the internal combustion engine.

The electric supercharger 200 is provided with the inverter 215 that controls the driving of the electric motor 212. Since the inverter 215 generates heat, the housing 211 is provided with a cooling device 231 that circulates cooling water (a refrigerant) inside. The cooling device 231 has a cooling water annular flow path (refrigerant flow path) 232, a cooling water supply flow path (refrigerant supply hole) 233, and a cooling water discharge flow path (refrigerant discharge hole) 234 formed in the housing 211.

The cooling water annular flow path 232 is provided on the inverter 215 side in the housing 211. That is, the cooling water annular flow path 232 is provided along the circumferential direction on the outer side in the radial direction of the bearing 222 in the housing 211. The cooling water annular flow path 232 is a flow path that is continuous in the circumferential direction. However, it is interrupted by providing an end portion at the upper portion of the housing 211. The cooling water supply flow path 233 and the cooling water discharge flow path 234 are provided along the radial direction at the upper portion of the housing 211. The cooling water supply flow path 233 and the cooling water discharge flow path 234 are provided side by side in the circumferential direction of the housing 211.

The housing 211 has a mounting surface 240 formed on the upper portion of the outer peripheral surface. The cooling water supply flow path 233 and the cooling water discharge flow path 234 are provided so as to be open in a direction orthogonal to the mounting surface 240. The cooling water supply flow path 233 and the cooling water discharge flow path 234 are provided side by side in order along the horizontal direction intersecting the axial direction of the rotary shaft 214. A tip portion of the cooling water supply flow path 233 communicates with one end portion of the cooling water annular flow path 232 through a connection flow path 235. The cooling water discharge flow path 234 communicates with the other end portion of the cooling water annular flow path 232 through a connection flow path 236.

One end portion of a cooling water supply pipe 241 is connected to the discharge side of a cooling water pump (not shown), and the other end portion is connected to the cooling water supply flow path 233. One end portion of a cooling water discharge pipe 242 is connected to the cooling water discharge flow path 234, and the other end portion is connected to the suction side of the cooling water pump.

As shown in FIG. 17, in the cooling water supply pipe 241, a flange part 151 as a first mounting flange is fixed to an end portion 241*a* that is connected to the housing 211. In the cooling water discharge pipe 242, a flange part 252 as a second mounting flange is fixed to an end portion 242*a* that is connected to the housing 211.

The flange part 251 is fixed by penetrating the cooling water supply pipe 241 through a through-hole 251*a*, and a contact portion 251*b* as a rotation prevention mechanism is formed at the outer peripheral portion. The contact portion 251*b* is for preventing the rotation of the cooling water supply pipe 241 with respect to the housing 211, and is a recessed portion having a curved shape following the outer peripheral surface of the cooling water discharge pipe 242. The flange part 252 is fixed by penetrating the cooling water discharge pipe 242 through a through-hole 252*a* formed on one end portion side, and a mounting hole 252*b* is formed on the other end portion side.

The end portion 241*a* of the cooling water supply pipe 241 is inserted into the cooling water supply flow path 233 of the housing 211, and the lower surface of the flange part 251 adheres to the mounting surface 240 of the housing 211 without any gap. The end portion 242*a* of the cooling water discharge pipe 242 is inserted into the cooling water discharge flow path 234 of the housing 211, the lower surface on one end portion side of the flange part 252 adheres to the upper surface of the flange part 251 of the cooling water supply pipe 241 without any gap, and the other lower surface adheres to the mounting surface 240 of the housing 211 without any gap. Further, a fastening bolt 253 penetrates the mounting hole 252*b* of the flange part 252 and is screwed into the screw hole 254. Further, in the flange part 251, the contact portion 251*b* comes into contact with the outer peripheral surface of the cooling water discharge pipe 242.

Therefore, the cooling water discharge pipe 242 is connected to the housing 211 by fixing the flange part 252 to the mounting surface 240 via the fastening bolt 253. In the cooling water supply pipe 241, the flange part 251 is overlapped below the flange part 252 and is pressed in the insertion direction of the cooling water supply pipe 241. Further, in the cooling water supply pipe 241, the contact portion 251*b* of the flange part 251 comes into contact with the outer peripheral surface of the cooling water discharge pipe 242 to prevent the rotation of the cooling water supply pipe 241. Therefore, the cooling water supply pipe 241 is connected to the housing 211 by fixing the flange part 151 to the mounting surface 240 by means of the cooling water discharge pipe 242 and the flange part 152.

In this manner, the supercharger of the fifth embodiment is the electric supercharger 200 that includes the electric motor 212 that drives and rotates the rotary shaft 214, the compressor 213 having the compressor wheel 225 provided at one end portion in the axial direction of the rotary shaft 214, and the inverter 215 that controls the driving of the electric motor 212.

Therefore, in the electric supercharger 200, a plurality of pipes 241 and 242 can be integrated and connected to the housing 211, and an increase in cost can be suppressed by suppressing an increase in the size of the housing 211, the occurrence of processing work on the mounting surface 240, or the like.

In the embodiments described above, in the exhaust turbine supercharger 10, the lubricant supply pipe 61, the cooling water supply pipe 81, and the cooling water discharge pipe 82 as pipes are integrated and connected to the upper portion of the housing 11, and in the electric supercharger 200, the cooling water supply pipe 241 and the cooling water discharge pipe 242 as pipes are integrated and connected to the upper portion of the housing 211. However, there is no limitation to these configurations. For example, in the exhaust turbine supercharger 10, only the cooling water supply pipe 81 and the cooling water discharge pipe 82 as pipes may be integrated and connected to the lower portion of the housing 11. Further, in the exhaust turbine supercharger 10, the lubricant supply pipe 61 and the lubricant discharge pipe 62 as pipes may be integrated and connected to the lower portion of the housing 11, and in addition, the cooling water supply pipe 81 or the cooling water discharge pipe 82 may be integrated and connected to the lower portion of the housing 11.

Further, in the embodiment described above, a configuration is made such that the mounting flange that is provided at the pipe is fastened to the housing by the fastening bolt 114. However, there is no limitation to this configuration. For example, a configuration may be made such that the mounting flange that is provided at the pipe is fixed to the housing by using the configuration of the contact portion 171*b* of the flange part 171 and the recessed portion 175 of the bearing housing 23 of the fourth embodiment. That is, instead of the fastening bolt 114 and the screw hole 115 of the first embodiment, the contact portion 171*b* and the recessed portion 175 may be used.

Further, in the embodiments described above, the mounting surfaces 101, 106, and 107 of the bearing housing 23 are horizontal surfaces. However, they may be inclined or curved surfaces. In this case, the flow paths 51, 73, and 74 may be orthogonal to the mounting surface or may be inclined with respect to the mounting surface. Further, in a case where the plurality of flow paths 51, 73, and 74 are provided on the mounting surface, a mounting surface having a different angle may be provided for each of the flow paths 51, 73, and 74.

REFERENCE SIGNS LIST

10: exhaust turbine supercharger
11: housing
12: turbine
13: compressor
14: rotary shaft
21: turbine housing
22: compressor housing
23: bearing housing
24, 25: journal bearing
26: thrust bearing
41: oil supply device
42: lubricant supply flow path
43: lubricant discharge flow path
51: first supply flow path (lubricant supply hole)
52: second supply flow path
53: third supply flow path
54: fourth supply flow path
55: fifth supply flow path
56: first discharge flow path
57: second discharge flow path
61: lubricant supply pipe (second pipe)
61*a*: end portion
62: lubricant discharge pipe
71: cooling device
72: cooling water annular flow path (refrigerant flow path)
73: cooling water supply flow path (refrigerant supply hole)
74: cooling water discharge flow path (refrigerant discharge hole)
75, 76: connection flow path
81: cooling water supply pipe (first pipe, third pipe)
81*a*: end portion
82: cooling water discharge pipe (first pipe)
82*a*: end portion
101: mounting surface
105: screw hole
106: first mounting surface
107: second mounting surface
108: step
109: restricting surface
111, 131, 141, 151, 161, 171: flange part (first mounting flange)
112, 132, 142, 152, 162, 172: flange part (second mounting flange)
113: flange part (first mounting flange, third mounting flange)
113*b*, 131*b*, 141*b*, 151*b*, 161*b*, 171*b*: contact portion
114: fastening bolt
200: electric supercharger
211: housing
212: electric motor
213: compressor
214: rotary shaft
215: inverter
231: cooling device
232: cooling water annular flow path (refrigerant flow path)
233: cooling water supply flow path (refrigerant supply hole)
234: cooling water discharge flow path (refrigerant discharge hole)
235, 236: connection flow path
240: mounting surface
241: cooling water supply pipe (first pipe, third pipe)
241*a*: end portion
242: cooling water discharge pipe (first pipe)
242*a*: end portion
251: flange part (first mounting flange)
251*b*: contact portion
252: flange part (second mounting flange)
253: fastening bolt
254: screw hole
OV: overlapping area

The invention claimed is:

1. A supercharger comprising:
a housing;
a rotary shaft that is rotatably supported inside the housing;
a compressor wheel that is provided at one end portion in an axial direction of the rotary shaft;
a first pipe that has a first mounting flange at an end portion thereof and that is connected to the housing;
a second pipe that has a second mounting flange at an end portion thereof and that is connected to the housing, and
an overlapping area where the first mounting flange and the second mounting flange overlap in a thickness direction of the first mounting flange and the second mounting flange,
wherein the end portion of the first pipe is inserted into a first mounting hole that is provided in the housing, and
the end portion of the second pipe is inserted into a second mounting hole that is provided in the housing, and
the second mounting flange fixes the first mounting flange to the housing by pressing the first mounting flange in the thickness direction in the overlapping area, and is fixed to the housing in an area other than the overlapping area.

2. The supercharger according to claim 1, wherein the rotary shaft is rotatably supported by the housing through a bearing, and at least one of the first mounting hole and the second mounting hole is a lubricant supply hole or a lubricant discharge hole communicating with the bearing.

3. The supercharger according to claim 1, wherein the housing has a refrigerant flow path provided around the rotary shaft, and at least one of the first mounting hole and the second mounting hole is a refrigerant supply hole or a refrigerant discharge hole communicating with the refrigerant flow path.

4. The supercharger according to claim 1, wherein the rotary shaft is rotatably supported by the housing through a bearing, one of the first mounting hole and the second mounting hole is a lubricant supply hole or a lubricant discharge hole communicating with the bearing, the housing has a refrigerant flow path provided around the rotary shaft, and the other of the first mounting hole and the second mounting hole is a refrigerant supply hole or a refrigerant discharge hole communicating with the refrigerant flow path.

5. The supercharger according to claim 1, wherein a rotation preventer for preventing rotation of the first pipe with respect to the housing is provided.

6. The supercharger according to claim 5, wherein as the rotation preventer, a contact portion that comes into contact with the second pipe to prevent rotation of the first pipe is provided in the first mounting flange.

7. The supercharger according to claim 5, wherein as the rotation preventer, a contact portion that comes into contact with the second mounting flange to prevent rotation of the first pipe is provided in the first pipe.

8. The supercharger according to claim 5, wherein as the rotation preventer, a contact portion that comes into contact with the housing to prevent rotation of the first pipe is provided in the first mounting flange.

9. The supercharger according to claim 1, wherein the first mounting flange and the second mounting flange overlap in a thickness direction of the first mounting flange and the second mounting flange, and both the first mounting flange and the second mounting flange are fixed to the housing.

10. The supercharger according to claim 1, wherein the first pipe and the second pipe are parallel to each other and are fixed to the housing.

11. The supercharger according to claim 1, wherein a first mounting surface of the housing, in which the first mounting hole is formed, and a second mounting surface of the housing, in which the second mounting hole is formed, are continuous flat surfaces.

12. The supercharger according to claim 1, wherein a first mounting surface of the housing, in which the first mounting hole is formed, and a second mounting surface of the housing, in which the second mounting hole is formed, are flat surfaces having a step therebetween, the first mounting flange comes into contact with the first mounting surface, and the second mounting flange comes into contact with the second mounting surface.

13. The supercharger according to claim 1, wherein a plurality of the first pipes are provided, and a common first mounting flange is provided at end portions of the plurality of first pipes.

14. The supercharger according to claim 1, wherein a plurality of the second pipes are provided, and a common second mounting flange is provided at end portions of the plurality of second pipes.

15. The supercharger according to claim 1, wherein a third pipe that has a third mounting flange at an end portion thereof and that is connected to the housing is provided, the first mounting flange and the second mounting flange overlap in a thickness direction of the first mounting flange and the second mounting flange, the second mounting flange and the third mounting flange overlap in a thickness direction of the second mounting flange and the third mounting flange, the second mounting flange is fixed to the housing and presses the first mounting flange and the third mounting flange in an insertion direction, and a rotation preventer for preventing rotation of the first pipe and the third pipe with respect to the housing is provided.

16. The supercharger according to claim 1, wherein a turbine wheel is provided at the other end portion in the axial direction of the rotary shaft.

17. The supercharger according to claim 1, wherein a motor that drives the rotary shaft is provided in the housing.

18. A method for connecting a pipe in a supercharger which includes a housing, a rotary shaft that is rotatably supported inside the housing, a compressor wheel that is provided at one end portion in an axial direction of the rotary shaft, a first pipe that has a first mounting flange at an end portion thereof and that is connected to the housing, a second pipe that has a second mounting flange at an end portion thereof and that is connected to the housing, and an overlapping area where the first mounting flange and the second mounting flange overlap in a thickness direction of the first mounting flange and the second mounting flange, the method comprising:

a step of inserting the end portion of the first pipe into a first mounting hole that is provided in the housing;

a step of inserting the end portion of the second pipe into a second mounting hole that is provided in the housing; and a step of fixing the first mounting flange to the housing by pressing the first mounting flange in the thickness direction in the overlapping area of the second pipe via the second mounting flange, the first mounting flange is fixed to the housing in an area other than the overlapping area.

* * * * *